United States Patent [19]

Horn

[11] 4,208,650

[45] Jun. 17, 1980

[54] DATA TRANSMISSION SYSTEM

[75] Inventor: Robert Horn, Richardson, Tex.

[73] Assignee: Forney Engineering Company, Carrollton, Tex.

[21] Appl. No.: 873,741

[22] Filed: Jan. 30, 1978

[51] Int. Cl.² .................. G08C 25/00; H04L 7/00
[52] U.S. Cl. ............................. 371/47; 371/49; 375/117
[58] Field of Search .......... 340/146.1 D, 146.1 AL, 340/146.1 AG; 178/69.1, 23 R, 23 A; 179/15 BS, 15 AE, 15 AP

[56] References Cited

U.S. PATENT DOCUMENTS

| | | | |
|---|---|---|---|
| 3,327,288 | 6/1967 | Webber | 340/146.1 AG |
| 3,412,380 | 11/1968 | Heller et al. | 340/146.1 AL |
| 3,560,924 | 2/1971 | McBride | 340/146.1 D |
| 3,729,590 | 4/1973 | Widl et al. | 179/15 AP |
| 3,753,228 | 8/1973 | Nickolas et al. | 340/146.1 D |
| 3,830,982 | 8/1974 | Christiansen | 179/15 AE |
| 3,836,956 | 9/1974 | Cross | 340/146.1 AB |
| 3,867,579 | 2/1975 | Colton et al. | 179/15 A |
| 3,922,493 | 11/1975 | Brenig et al. | 179/15 AP |
| 3,939,307 | 2/1976 | Bishop | 179/15 A |
| 3,963,869 | 6/1976 | Caldwell | 340/146.1 AG |
| 3,970,794 | 7/1976 | Neufang | 179/15 AQ |
| 3,970,798 | 7/1976 | Epenoy et al. | 179/15 AF |
| 4,002,834 | 1/1977 | Cocci et al. | 178/69.1 |
| 4,013,836 | 2/1977 | Williams | 178/58 R |
| 4,027,243 | 5/1977 | Stackhouse et al. | 178/69.1 |

*Primary Examiner*—Charles E. Atkinson
*Attorney, Agent, or Firm*—Marvin A. Naigur; John E. Wilson; John J. Herguth, Jr.

[57] ABSTRACT

A data transmission system is provided for transmitting data over a communication link extending between a transmitter and a receiver. The transmitter is connected to a data containing unit and operates through a data cycle which addresses the data unit to provide a plurality of serially arranged message frames during each data cycle. Each message frame includes a marker bit, a sync word, data words having either digital or analog information, address and error words, a checkword, and various parity and start bits. The receiver, which is connected to another data unit, is adapted to recognize each message frame by means of the marker bit and the sync word, and evaluate the message validity by means of the parity and start bits, and the checkword. The data received in each verified message frame is then used to update a portion of the other data unit.

17 Claims, 17 Drawing Figures

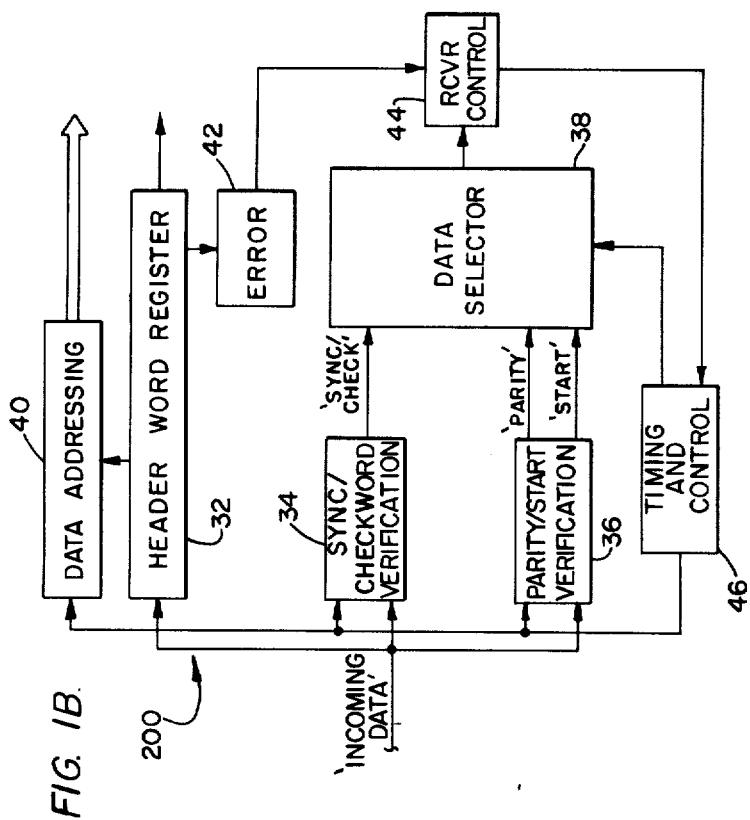
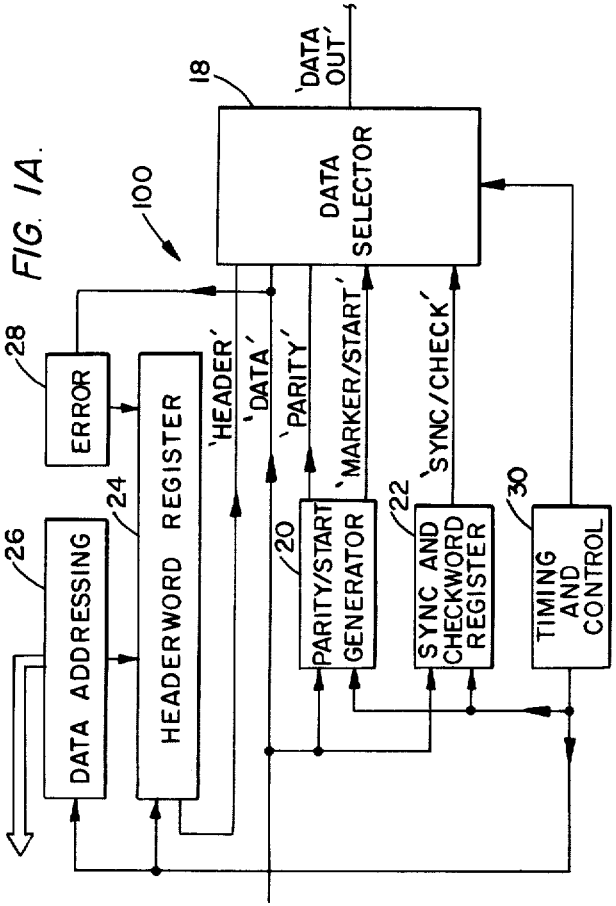
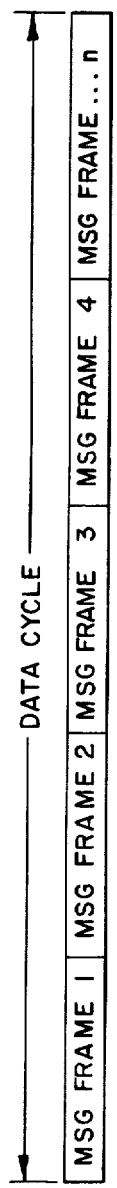
FIG. 1.
FIG. 1A.
FIG. 1B.
FIG. 2.

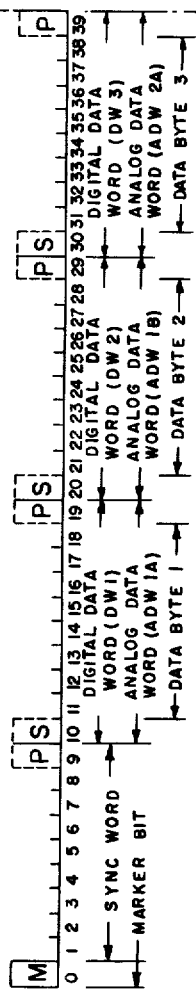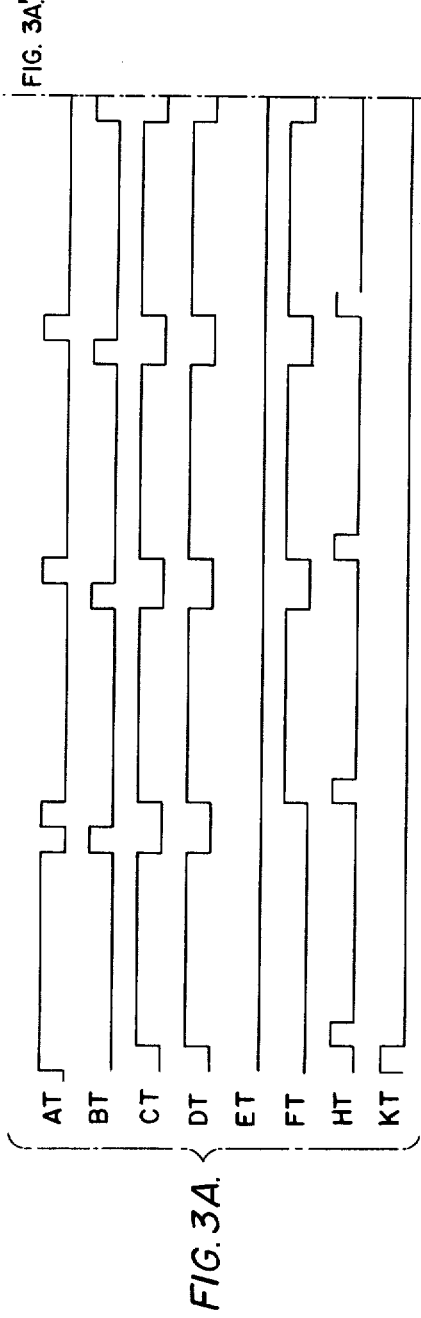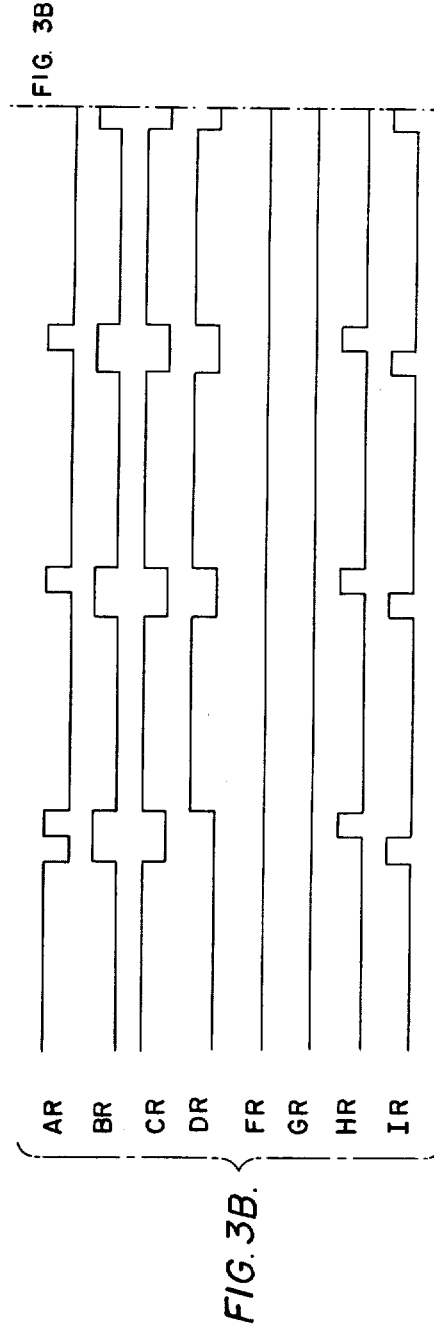

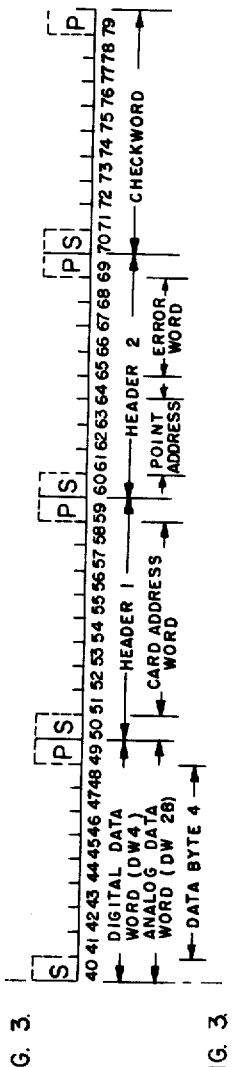
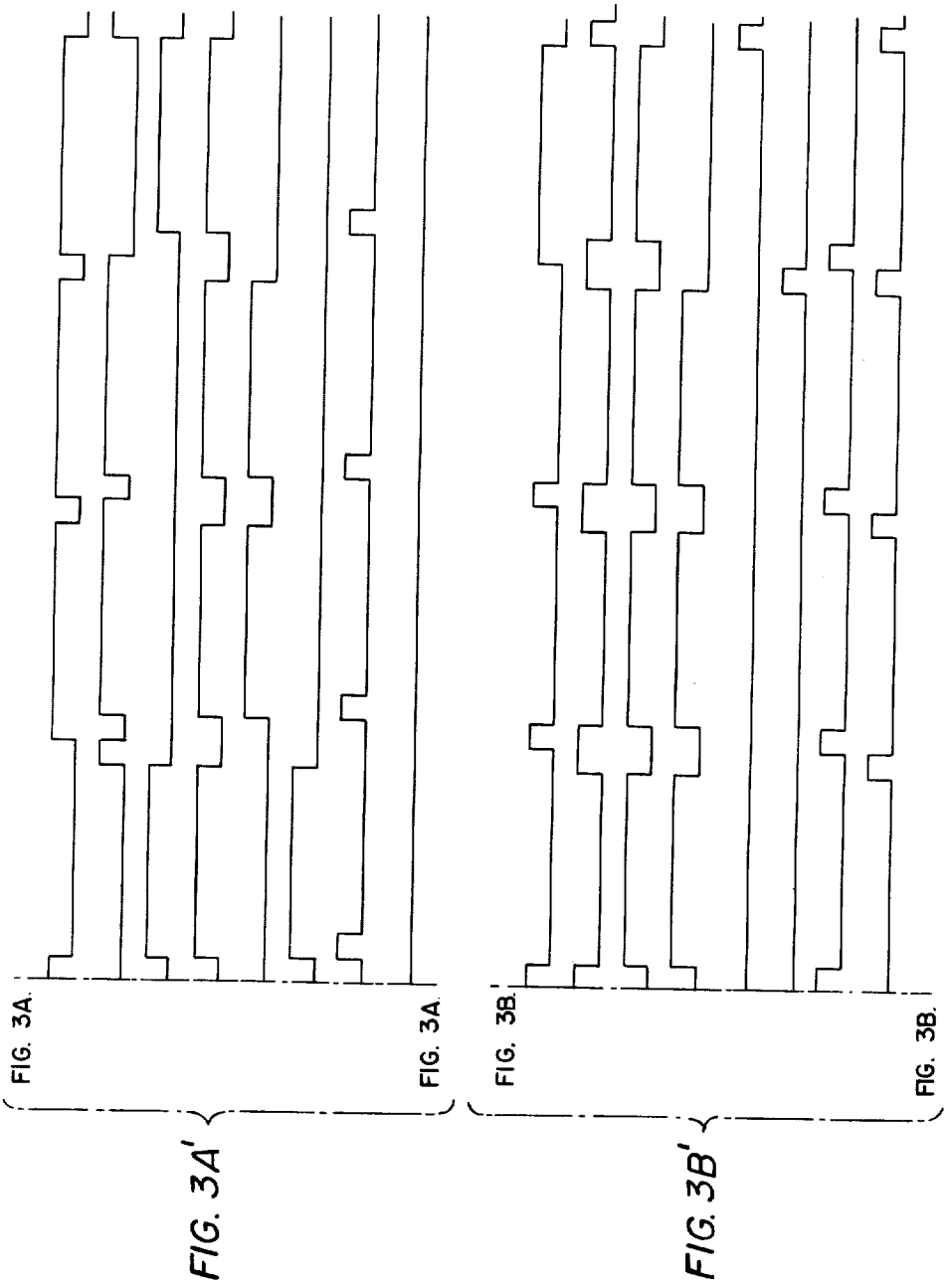
FIG. 3.
FIG. 3'
FIG. 3A'
FIG. 3B'

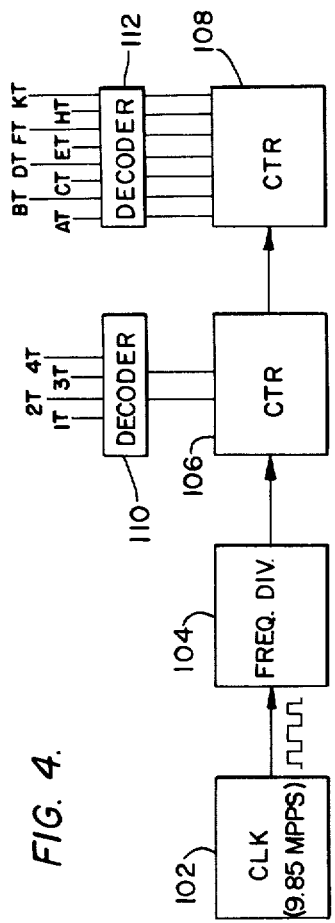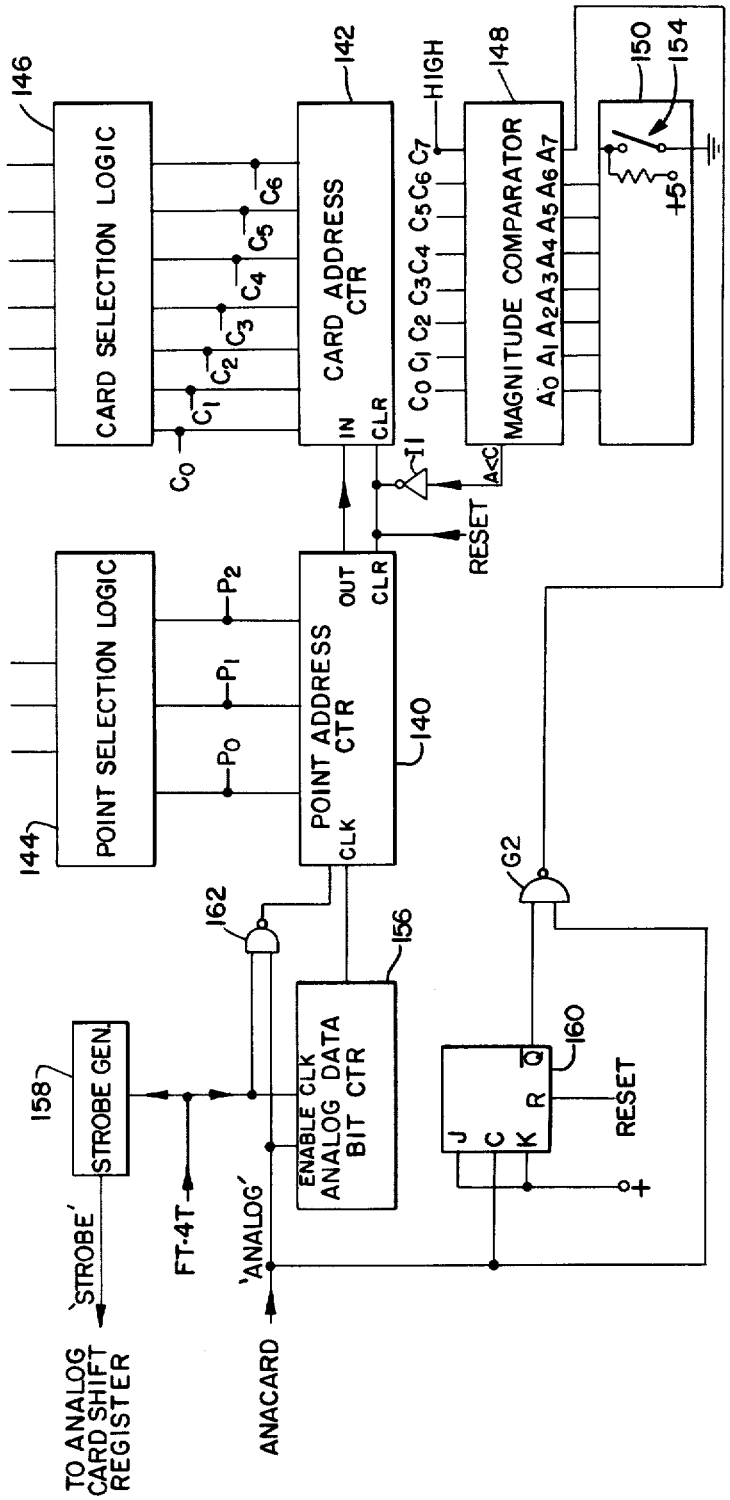
FIG. 4.
FIG. 6.

FIG. 7.

| | |
|---|---|
| 0 0 0 0 0 0 0 0 | SHIFT REGISTER 118 CONTENTS AT BIT POSITION 10 |
| 1 0 1 0 0 1 1 0 | DATA WORD DW 1: BIT POSITIONS 11-18 |
| 1 0 1 0 0 1 1 0 | FIRST INTERMEDIATE RESULT |
| 1 0 1 1 1 0 0 1 | DATA WORD DW 2: BIT POSITIONS 21-28 |
| 0 0 0 1 1 1 1 1 | SECOND INTERMEDIATE RESULT |
| 1 1 1 1 0 0 1 1 | DATA WORD DW 3: BIT POSITIONS 31-38 |
| 1 1 1 0 1 1 0 0 | THIRD INTERMEDIATE RESULT |
| 0 1 1 0 1 1 0 1 | DATA WORD DW 4: BIT POSITIONS 41-48 |
| 1 0 0 0 0 0 0 1 | FOURTH INTERMEDIATE RESULT |
| 0 1 0 1 0 1 0 1 | HEADERWORD 1: BIT POSITIONS 51-58 |
| 1 1 0 1 0 1 0 0 | FIFTH INTERMEDIATE RESULT |
| 1 0 1 0 1 0 1 1 | HEADERWORD 2: BIT POSITIONS 61-68 |
| 0 1 1 1 1 1 1 1 | CHECKWORD (EVEN VERTICAL PARITY) |

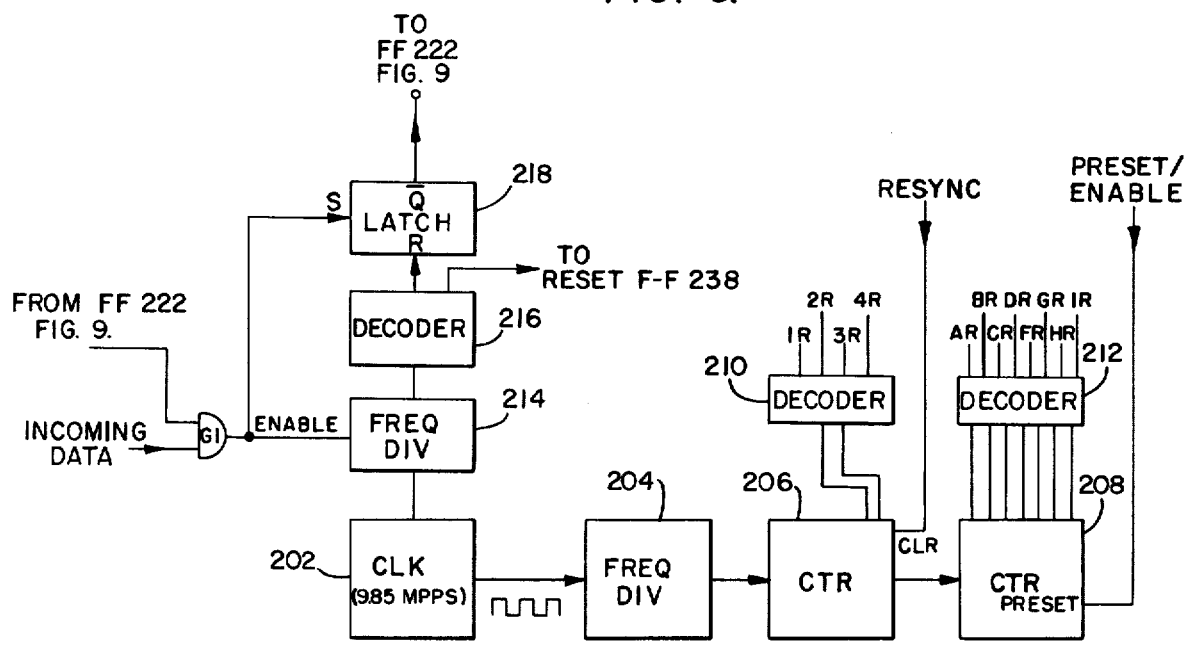

FIG. 8.

DATA TRANSMISSION SYSTEM

BACKGROUND OF THE INVENTION

The present invention relates to data transmission systems for transmitting data from a transmitter to a receiver over a communication link and, more specifically, to such systems for transmitting serially arranged binary information in message frame groups.

Many industrial control systems require the cooperative control of a plurality of related functions. These functions may be located proximate to one another, or, as is more common, remotely located from one another. In many cases, the overall control is achieved by means of a plurality of control units each of which is connected to a data unit. These data units may have, for example, buffer, translation, and isolation circuits, and/or storage registers, which are adapted to store digital data or digital data which is representative of analog data. It is generally desirable to update the various data units so that the entire control system operates in response to the latest available data. To accomplish this, it is necessary to provide a data transmission system between corresponding data units.

It is an overall requirement of any data transmission system for transmitting data from a first data unit to a second data unit, that the second data unit be undated in an efficient and reliable manner. To this end, a data transmission system must be able to address the first data unit; form the addressed data into a transmission format; include data identifying and verifying information; verify the transmission format at the second data unit; and address and update the corresponding data storing locations of the second data unit.

Data transmission systems meeting these requirements generally include a transmitter connected by a communication link to a receiver. The transmitter is adapted to cyclically address a first data unit and form the data addressed into message groups which also include message identity information, error and validity information, and data address information. The receiver is adapted to recognize each message, evaluate the validity of the message, and address the data to a second data unit in response to the reception of a valid message.

The present invention provides an improved transmission system which meets the above requirements and is adapted to reliably and efficiently transmit data between data units.

SUMMARY OF THE INVENTION

It is an object of the present invention to provide a data transmission system having a transmitter for transmitting a data containing message frame which starts with a binary one/binary zero combination and a receiver which is adapted to detect and respond to the binary one/binary zero combination.

It is another object of the present invention to provide a data transmission system having a transmitter for forming and transmitting message frames having a plurality of serially arranged binary words which start and conclude, respectively, with a start bit and a parity bit in which the start bit is the complement of the preceeding parity bit.

It is still another object of the present invention to provide a data transmission system having a receiver with means to detect the transition between complementary start and parity bits and to resynchronize the receiver clock in response thereto.

It is still another object of the present invention to provide a data transmission system having a transmitter for forming and transmitting message frames having a plurality of information bearing words with means to provide a binary representation of vertical parity between the corresponding bit positions of each of the words in the message frame.

It is still another object of the present invention to provide a data transmission system having a transmitter for forming and transmitting data cycles which may contain either digital data only or digital data and analog data in digital form, and with means to determine a ratio of data cycles with and data cycles without analog data.

It is still another object of the present invention to provide a data transmission system having a transmitter for transmitting data containing message frames and a receiver for receiving said data with improved means for maintaining synchronization of the receiver with the transmitted data.

It is another object of the present invention to provide a data transmission system having a transmitter and receiver for transmitting data containing message frames with improved means to enable the receiver to detect the start of a message frame.

It is still a further object of the present invention to provide a data transmission system with an improved system for detecting errors in the transmitted data and preventing the receiver from responding to transmitted data containing errors.

It is still another object of the present invention to provide a transmission system to transmit data from data stores at the transmitter to update corresponding data stores at a receiver with improved means to more efficiently maintain the data stores at the data receiver updated in accordance with the data stores at the transmitter.

Towards the fulfillment of these objects, and others, the present invention provides a data transmission system having a transmitter connected to a receiver by means of a communication link. The transmitter is adapted to operate through data cycles to address a central data unit containing both digital data and digital data representations of analog values and transmit serially arranged data containing message frames to the receiver which is adapted to update the data unit in response to the reception of valid message frames. The data cycles may contain either message frames with digital data only, or message frames with both digital data and digital data representative of analog values. The transmitter is provided with means to determine the ratio of data cycles with and without digital data representative of analog values. Each of the message frames includes a marker bit, a sync word, data words, header words, a checkword, and various start and parity bits. The message frames start with a binary 1/binary 0 combination, and each word in the message frame has a start bit and a concluding parity bit, with the start bit being complementary to the preceeding parity bit. The checkword in each message frame is the EXCLUSIVE-OR result of the corresponding bits of each of the other words in the message frame and represents vertical parity.

The receiver is adapted to detect and enable itself in response to the binary 1/binary 0 combination, to detect and resynchronize its clock in response to the transition between complementary start and parity bits, and test the validity of the transmitted message frame by generating start and parity bits, and a checkword for comparision with the start and parity bits, and the checkword of the received message frame.

BRIEF DESCRIPTION OF THE DRAWINGS

The above description, as well as the objects, features, and advantages, of the present invention will be more fully appreciated by reference to the following detailed description of a presently preferred, but nonetheless illustrative, embodiment in accordance with the present invention, when taken in conjunction with the accompanying drawings wherein:

FIG. 1 is a functional block diagram of a data transmission system in accordance with the present invention;

FIG. 1A is a functional block diagram of the transmitter shown in FIG. 1;

FIG. 1B is a functional block diagram of the receiver shown in FIG. 1;

FIG. 2 is a schematic illustration of a data transmission cycle comprising a plurality of n serially arranged message frames;

FIG. 3 illustrates the first 40 bit positions of a preferred 80 bit message frame format;

FIG. 3' illustrates the second 40 bit positions of the preferred 80 bit message frame format;

FIG. 3A is a timing and control signal diagram illustrating the control signals for the transmitter illustrated in FIGS. 1 and 1A for the first 40 bit positions of FIG. 3;

FIG. 3A' is a timing and control signal diagram illustrating the control signals for the transmitter illustrated in FIGS. 1 and 1A for the second 40 bit positions of FIG. 3';

FIG. 3B is a timing and control diagram, similar to that illustrated in FIG. 3A, showing the timing and control signals for the receiver illustrated in FIGS. 1 and 1B for the first 40 bit positions of FIG. 3;

FIG. 3B' is a timing and control diagram, similar to that illustrated in FIG. 3B, showing the timing and control signals for the receiver illustrated in FIGS. 1 and 1B for the second 40 bit positions of FIG. 3';

FIG. 4 is a functional block diagram of the timing and control signal section of the transmitter illustrated in FIG. 1;

FIG. 6 is a functional block diagram of the data card addressing section of the transmitter illustrated in FIG. 1;

FIG. 7 is a column of binary numbers illustrating the formation of a checkword representing vertical or columnar parity;

FIG. 8 is a functional block diagram of the timing and control signal section of the receiver illustrated in FIG. 1;

DESCRIPTION OF THE PREFERRED EMBODIMENT

Figure 5:
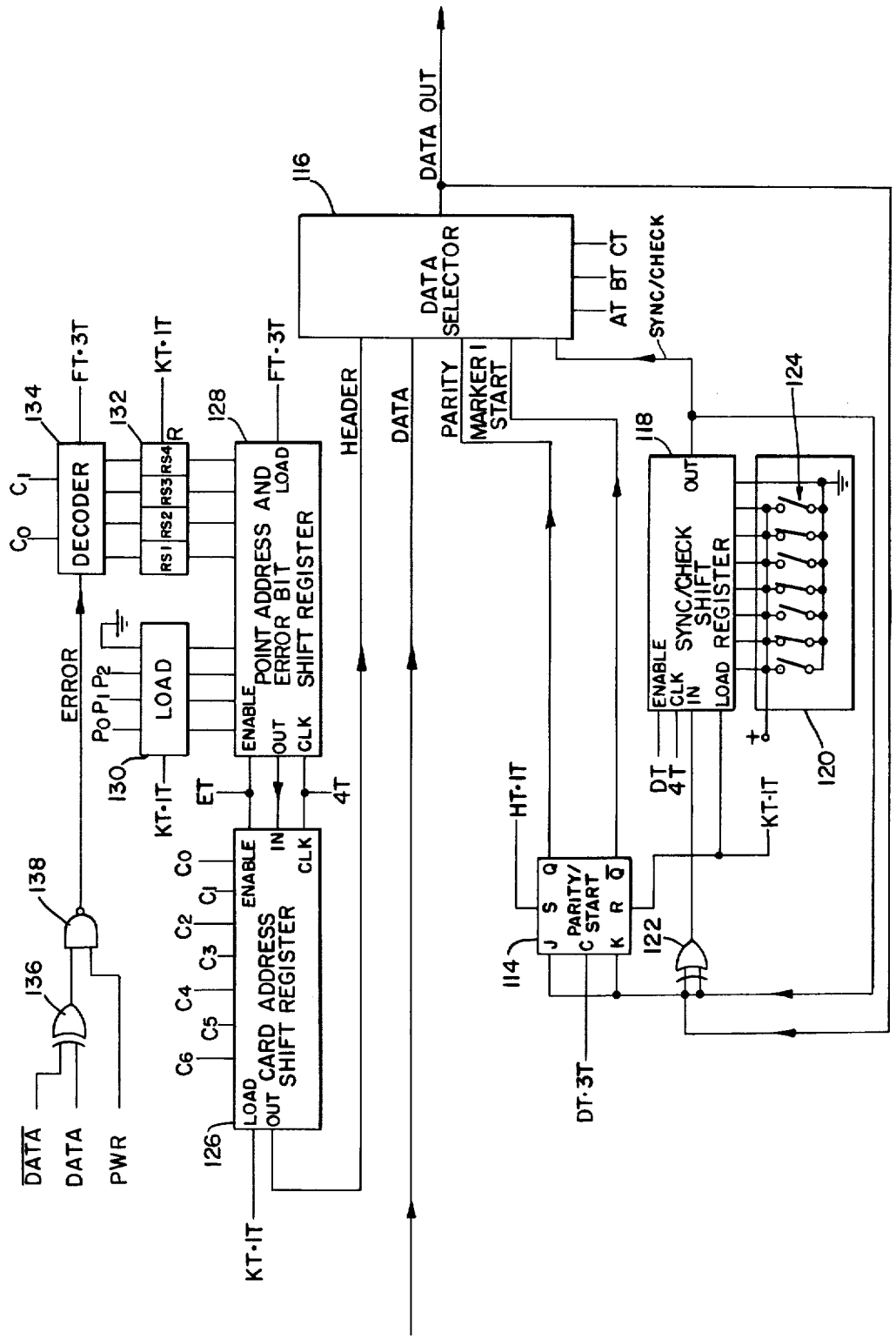
FIG. 5 is a functional block diagram of the parity-/start bit and sync word section of the transmitter illustrated in FIG. 1.

A pulse code modulation data transmission system in accordance with the present invention is illustrated in functional block form in FIG. 1 and is generally referred to herein by the reference character 10. The system 10 includes a transmitter 100 for transmitting digital data over a communications link 12 to a receiver 200. The transmitter 100 is connected to and is adapted to address a data unit 14 which supplies the data for transmission. The data, after it is received and verified by the receiver 200, is supplied to a data unit 16. In the preferred embodiment, the data unit 14 is part of a controller of the type utilized in industrial installations, as, for example, a power installation, and includes a plurality of analog and digital data carrying cards (not shown). As will be explained in detail below, the transmitter 100 operates through a data cycle to address various digital and analog data cards in the data unit 14 in a sequential manner to provide eight bit data groups, defined herein as bytes, for inclusion into message frames having a marker pulse, a sync word, data word address information, a checkword, and various error, parity, and start bits. Each message frame of the data cycle is transmitted in a serial fashion over the communications link 12, which may take the form of a twisted wire pair, to the receiver 200, where the sync word is verified, and the message validity evaluated by means of the various error, parity and start bits, and the checkword. If the message frame is deemed valid by the receiver 200, the data bytes are addressed to the data unit 16 in a sequential manner to update the data cards in the data unit 16. If the message frame is deemed invalid, the message data is not used and the receiver 200 is reset to receive the next successive message frame transmitted during the data cycle.

The system 10 shown in FIG. 1 is a simplex system adapted for one-way transmission. As is readily apparent, a duplex system may be arranged by providing an additional transmitter, receiver, and communications link of the type illustrated in the figures and described below for transmitting data in a direction opposite to that shown in FIG. 1.

Data Cycle and Message Frame Format

As shown in FIG. 2, the transmitter 100 operates to transmit a data cycle which comprises n serially arranged message frames. During each data cycle, the data in the data unit 14 is sequentially addressed in eight bit groups or bytes with the data inserted into the n serially transmitted message frames.

The data in the data unit 14 is contained on either digital data cards or analog data cards. Each digital data card includes a plurality of digital data points thereon with each data point connected to an isolation translation circuit to provide a binary indication of a condition at the transmitter 100 location. For example, an isolation translation circuit may receive its input from a switch and provide a binary indication at its digital data point as to the state of the switch. When a digital data card and a digital data point is addressed by the transmitter 100, the bit of binary information stored in the addressed data device is accessed for inclusion in a digital message frame. Each analog data card includes at least one analog/digital converter connected to the parallel inputs of a shift register with the serial output of the shift register connected to an analog data point. An analog/digital converter converts an analog value, such as voltage, into a binary number for storage into the analog card shift register. When the analog data card and the analog data point on the card are addressed by the transmitter 100, the binary information in the analog card shift register is shifted out for inclusion into an analog message frame.

In the preferred embodiment, the data unit 14 may contain up to 128 data cards, the majority of which are digital data cards having eight digital data points and the remainder of which are analog data cards having eight analog data points. The transmitter 100 is adapted to address the digital data cards in groups of four to provide four digital data bytes of eight bits each for inclusion in a digital message frame, and to address the analog data points in groups of two to provide two groups of 16 analog data bits for inclusion in an analog message frame. For example, if the data unit 14 contains 124 digital data cards having eight digital data points each, and one analog data card having eight analog data points, the data cycle will comprise 31 digital message frames each containing four bytes or 32 bits of digital data for each group of four digital data cards, and four analog message frames each containing two groups of 16 bits of digital data (representative of analog values) for each group of two analog data points.

The message frame format for both digital and analog message frames is shown in FIGS. 3 and 3' and comprises a serially arranged 80 bit message having bit intervals or positions 0–79. The message frame includes a marker bit, a nine bit sync word; four 10 bit data words; two 10 bit header words; and a 10 bit checkword. The digital data words are represented by the reference characters DW 1, DW 2, DW 3, and DW 4; while the analog data words are represented by the reference characters ADW 1A and 1B, and ADW 2A and 2B. The marker bit occupies bit position 0 and is always a binary one. The sync word occupies bit positions 1–9 with the bit position 1 assigned a binary 0 to provide a binary 1 to binary 0 transition between the marker bit and the first bit position of the sync word. Binary 1 is represented by one voltage signal level and binary zero is represented by a different voltage signal level. The binary 1/binary 0 signal level transition, as explained below, provides a means to condition the receiver 200 to receive and detect the sync word. The sync word is arbitrarily selected at the transmitter 100 and is provided to enable the receiver 200 to detect that it is receiving the first byte of a new message frame. The sync word concludes with a parity bit in bit position 9 which provides odd horizontal or row parity. Each of the data words begins, respectively, with a start bit in the bit positions 10, 20, 30 and 40, and concludes, respectively, with a parity bit to provide odd horizontal parity in the bit positions 19, 29, 39 and 49. The start bit, in all cases, is the complement of the preceding parity bit. Each data word includes an eight bit data byte between the start and the parity bits. The first header word starts and concludes, respectively, with a start bit in the bit position 50 and a parity bit in the bit position 59, and includes binary information in the bit positions 51–58 representing the initial data card addressing. The second header word starts and concludes, respectively, with a start bit in the bit position 60 and a parity bit in the bit position 69. The second header word includes binary information in the bit positions 61–63 representing an initial data point address, and binary information in the bit positions 65–68 representing the output of an error detection circuit. The bit position 64, as described below, is not utilized for information purposes and is arbitrarily assigned a binary 0 value. The message frame ends with the checkword which starts and concludes, respectively, with a start bit in a bit position 70 and a parity bit in the bit position 79, and includes binary information in the bit positions 71–78 which represents even vertical or columnar parity and is unique to the data words and the header words.

Transmitter and Receiver Organization

The overall functional organization of the transmitter 100 and the receiver 200 is shown, respectively, in FIGS. 1A and 1B.

As shown in FIG. 1A, the transmitter 100 includes a data selector 18 which is adapted to selectively address one of five inputs, namely, a 'header', a 'data', a 'parity', a 'marker/start', or a 'sync/check' input and route the selected input to a 'data out' line. A parity/start generator 20, which has its outputs 'parity' and 'marker/start' connected to the data selector 18, is provided to generate the marker bit and the various parity and start bits of each message frame. A sync/checkword register 22, which has its output 'sync/check' connected to the data selector 18, is provided to supply the sync word and generate a checkword for each message frame. A header word register 24, which has its output 'header' connected to the data selector 18, is provided to supply the first and second header words of each message frame. A data addressing unit 26, which is connected to and supplies addressing information to the header word register 24, is adapted to address the various data cards in the data unit 14 and gate the addressed data to the 'data' input of the data selector 18. An error detector 28, which is connected to the header word register 24, detects anomalous conditions which may occur during the transmission of the data and inserts appropriate error indicating bits in the second header word. A timing and control unit 30 operates to provide the various timing and control signals to the transmitter devices described above.

The transmitter 100 functions in the following manner to generate a message frame. At the beginning of each message frame, the data selector 18 selects its 'marker/start' input, and concurrently therewith, the parity/start generator 20 provides a marker bit which is routed by the data selector 18 to the 'data out' line. The data selector 18 then selects its 'sync/check' input at which time the sync/checkword register 22 is enabled to provide a sync word which is routed to the 'data out' line by the data selector 18. During the transmission of the sync word, the parity/start generator 20 functions to generate a parity bit for the sync word and a complementary start bit for the first data word. At the end of the sync word transmission, the data selector 18 is enabled to select, respectively, its 'parity' and then its 'marker/start' input to route the appropriate parity and start bits to the 'data out' line. The data selector 18 then selects the 'data' input while the addressing section 26 is enabled to provide data address information to the header word register 24 and to address a data card in the data unit 14 to provide the first eight bit data byte to the 'data out' line. As in the case of the sync word, the parity/start generator 20 functions during the transmission of the first data byte to generate an appropriate parity bit and a complementary start bit. At the end of the first data byte, the data selector 18 is enabled to select, respectively, its 'parity' and its 'marker/start' inputs to provide the appropriate parity and start bits to the 'data out' line. In a manner identical to that described above, the remaining three data bytes and their respective parity and start bits are transmitted. The data selector 18 is then enabled to select its 'header' input and the header word register 24 enabled to transmit the first and second header words with the appropriate parity and start bits. After the header words are transmitted, the data selector 18 is enabled to select its 'sync/check' input and the sync/checkword register 22 is enabled to transmit a checkword which was generated during the transmission of the data bytes and the header word information. Finally, the data selector 18 is enabled to select its 'parity' input to transmit the checkword parity bit.

The receiver 200 includes a header word register 32, a sync and checkword verifier 34, and a parity/start verifier 36 which have their respective inputs connected to an 'incoming data' line. The sync and checkword verifier 34 has its output 'sync/check', and the parity/start verifier 36 has its outputs 'parity' and 'start' connected to the inputs of a data selector 38. The header word register 32 is connected to a data addressing unit 40 which provides addressing to the data unit 16 and to an error detector 42 which is responsive to any error bits in the incoming data. The sync and checkword verifier 34 is adapted to provide and generate, respectively, a sync word for comparison with the incoming sync word, and a checkword for comparison with the incoming checkword. In a similar manner, the parity/start verifier 36 is adapted to generate parity and start bits for comparison with the various incoming parity and start bits. If a mismatch is detected between the incoming parity, and start bits, or the sync and checkword, a fault signal is routed by the data selector 38 to a receiver control circuit 44 which provides overall receiver control. The receiver 200 also includes a timing and control unit 46 which operates to provide the various timing and control signals to the receiver 200 devices described above.

The receiver 200 functions in the following manner to receive and evaluate the incoming message frame. The receiver 200, which, prior to the reception of the message, is in a PRESET state, is switched to an ENABLE state by the incoming binary 1 marker bit. The incoming sync word is introduced into the sync/checkword verifier 34 where it is compared with a previously stored sync word. During this comparision, the data selector 38 is enabled to select its 'sync/check' input for routing to the receiver control circuit 44. If a mismatch is detected between the incoming sync word and the internally stored sync word, a fault signal is issued by the sync/checkword verifier 36 to the receiver control circuitry 44 to terminate the reception of the message and return the receiver 200 to its PRESET state. If the incoming sync word is in proper form, the parity/start verifier 36 then functions to compare the incoming parity and start bits with internally generated parity and start bits. Durng the parity and start bit comparison, the data selector 38 is enabled to select, respectively, its 'parity' and then its 'start' input for routing to the receiver control circuitry 44. If a mismatch is detected between the incoming parity bit and the internally generated parity bit, or the incoming start bit and the internally generated start bit, a fault signal is issued by the parity/start verifier 36 to cause the receiver control circuit 44 to terminate the reception of the message and return the receiver 200 to its PRESET state. After the sync word, and the parity and start bits are received, the incoming data bytes and the header word information is read into the header word register 32 during which time the parity/start verifier 36 functions to generate parity and start bits for comparison, respectively, with the incoming parity and start bits at the beginning and end of each data word and each header word. If a mismatch should occur between the incoming parity or start bits and the internally generated parity and start bits, a fault signal will be issued to the receiver control circuit 44 to terminate the reception of the message and return the receiver to its PRESET condition. After the incoming data bytes and the card address information in the first and second header words are read into the header word register 32, the error detector 42 determines if any error bits were transmitted with the incoming message frame. If any error bits were present, the incoming data bytes are not utilized to update the data unit 16. After the data bytes and the header information is read into the header word register 32, the incoming checkword is compared with a checkword internally generated by the sync/checkword verifier 34. If there is a mismatch, the data selector 38 routes a fault signal to the receiver control circuit 44 to terminate the reception of the message and return the receiver 200 to the PRESET state. If no mismatch was detected, the data bytes are read out of the header register 32 to update the data unit 16.

The Transmitter Circuitry

The transmitter 100 circuitry is shown in FIGS. 4, 5, and 6, and includes a timing and control signal section (FIG. 4); a message frame assembly section (FIG. 5); and a data card addressing section (FIG. 6).

As shown in FIG. 4, the timing and control signal section includes a clock 102 which provides a train of clock pulses at an arbitrarily selected pulse repetition rate, such as, for example, 9.85 MPPS. The clock pulses are inputed to a frequency divider 104 which in turn increments an intra-bit counter 106 serially cascaded with a frame interval counter 108. The outputs of the counters 106 and 108 are connected, respectively, to a decoder 110 and a decoder 112. The counter 106 is adapted to recycle each bit interval with the decoder 110 providing four intra-bit outputs 1T, 2T, 3T and 4T for each binary interval. Each intra-bit output occupies one-quarter of a bit interval. The frame counter 108 is adapted to recycle each 80 bit frame interval with the decoder 112 providing the timing and control signals AT, BT, CT, DT, ET, FT, HT, and KT. The transmitter 100 timing and control signals issued by the decoder 112 are illustrated in FIGS. 3A and 3A' in vertical registration, respectively, with the bit positions of the message frame of FIGS. 3 and 3'. While the decoder 112 may take the form of a conventional decoding logic array, it is preferably in the form of a micro-programmed read only memory (ROM). The various outputs of the decoders 110 and 112 may be inputed to various inverters, NAND and AND gates (not shown) in a conventional manner to provide various NOT, sum of the products, and product of the sums timing and control signal combinations. The exact combination of timing and control signals required is dictated by the control requirements of the devices selected to implement the present invention. As used herein, a superposed bar symbol, appearing above an input, output, or control signal symbol, indicates that the input, output, or control is the binary complement of the input, output, or control without superposed bar. For example, a $\overline{Q}$ output is the binary complement of the Q output. The timing and control signals of FIGS. 3A and 3A' are utilized by the transmitter 100 circuitry of FIGS. 5 and 6 to selectively enable or inhibit various devices to generate and assemble the various words of the message frame.

As shown in FIG. 5, the transmitter 100 message frame assembly section is divided into a parity/start bit section, a sync and checkword section, a header word section, and a data selector section.

The parity/start bit, and the sync and checkword section generally occupy the lower portion of FIG. 5 and includes a parity/start flip-flop 114, a data selector 116, a sync and checkword shift register 118, a sync word switch register 120, and an EXCLUSIVE OR comparator circuit 122. The parity/start flip-flop 114 functions to provide the message frame marker bit at binary position 0, and the parity and start bits at the end and beginning of each word in the message frame. The sync word switch register 120 is provided to store a preselected sync word for loading into the sync and checkword shift register 118. The EXCLUSIVE OR circuit 122 in cooperation with the sync and checkword shift register 118, generates a unique checkword as the data bytes and headerword information bits are transmitted.

The data selector 116 has a 'data out' output and five data inputs designated herein as the 'sync/check' input, the 'marker/start' input, the 'parity' input, the 'data' input, and the 'header' input. The data selector 116 is adapted to select one of these five inputs and route the selected input to the 'data out' line in response to the control signals AT, BT, and CT.

The parity/start flip-flop 114 is a conventional J-K flip-flop which is reset by applying a combination of the KT and 1T control signals to the R input, and which is set by applying a combination of the HT and 1T control signals to the S input. The J and K inputs of the flip-flop 114 are connected to the 'data out' line such that the flip-flop 114 may be enabled for toggling between its set and reset states by applying a combination of the DT and 3T control signals to the C input. The Q and $\overline{Q}$ output of the parity/start flip-flop 114 are connected, respectively, to the 'parity' and the 'marker/start' inputs of the data selector 116.

The sync word switch register 120 includes a plurality of SPST switches 124 connected to the parallel inputs of the sync and checkword shift register 118. The switches 124 provide a binary 1 input to the shift register 118 when they are open and a binary 0 input when they are closed. In the preferred embodiment, the first bit of the sync word, that is, bit position 1 is always a binary 0. To this end, the first bit position of the sync and checkword shift register 118 is connected to ground. In FIG. 5, the sync word switch register 120, when read from the right to the left, is shown storing the sync word 01010101. The sync word is loaded into the sync and checkword shift register 118 from the sync word switch register 120 by a combination of the KT and 1T control signals applied to the load input of the sync and checkword shift register 118 and is shifted out of the shift register 118 by the intra-bit control signal 4T applied to the clock input when the DT control signal is applied to the clock enable input. The output of the sync and checkword shift register 118 is connected to the 'sync/check' input of the data selector 116.

The EXCLUSIVE OR circuit 122 has its output connected to the serial input of the sync and checkword shift register 118. One of EXCLUSIVE OR circuit 122 inputs is connected to the output of the sync and checkword shift register 118 and the other of its inputs connected to the 'data out' line and to the J-K inputs of the parity/start flip-flop 114.

The header word section, which generally occupies the upper portion of FIG. 5, includes a data card address shift register 126, a data point and error bit shift register 128, an intermediate data point register 130, a quad error bit latch 132, and an error bit decoder 134. An error detection circuit, consisting of an EXCLUSIVE OR circuit 136 and a NAND gate 138, is connected to the input of the error bit decoder 134.

The shift registers 126 and 128 are serially cascaded and both contain eight bit positions. The data address shift register 126 has its parallel inputs, designated C0 through C6, connected to a data card address counter which is described below. The data card address information is loaded into the shift register 126 by a combination of the KT and 1T control signals applied to the shift register 126 load input and is enabled for shifting by the ET and 4T control signals applied, respectively, to the clock enable and clock inputs. The serial output of the shift register 126, 'header', is connected to the data selector 116.

The intermediate data point storage registers 130 is a four bit register which, in response to a combination of the KT and 1T control signals, is adapted to load a data point address P0, P1, and P2 from a data point counter which is described below.

The error bit storage latch 132 is a four bit register, formed from four RS type latches RS1–RS4, which has its parallel outputs connected to the last four bit positions of the shift register 128 and its parallel inputs connected to the error bit decoder 134. The decoder 134 is adapted, in response to the control signals C0 and C1, to direct its input 'error' to one of the four RS latches of the error bit storage latch 132.

The error bit generator consist of the $\overline{\text{EXCLUSIVE OR}}$ circuit 136 having DATA and $\overline{\text{DATA}}$ inputs and the NAND gate 138 connected to the output of the EXCLUSIVE OR circuit 136 and a POWER signal. As long as the voltage levels which define the binary 1's and 0's are such that the EXCLUSIVE OR circuit 136 can distinguish between the two, the EXCLUSIVE OR circuit 136 output is a binary 1. Should the binary 1 and binary 0 voltage levels degrade such that the EXCLUSIVE OR circuit 136 cannot distinguish between the two, the EXCLUSIVE OR circuit 136 output will be a binary 0 thereby causing a binary 1 to appear at the output of the NAND gate 138. In addition, should the power level drop, a binary 1 will also appear at the output at the NAND gate 138. Any binary 1 error bits that are generated during the transmission of the data bytes are are inserted into bit positions 65–68 of the shift register 128 through the error bit storage latches 132 by the decoder 134.

As shown in FIG. 6, the data card address section of the transmitter 100 includes a point address counter 140 serially cascaded with an eight bit data card address counter 142. The parallel outputs P0, P1, and P2 of the point address counter 140 are connected to the parallel inputs of the point selection logic 144 and to the parallel inputs of the data point intermediate register 130 (FIG. 5) described above.

The parallel outputs C0–C6 of the card address counter 142 are connected to the parallel inputs of the card selection logic 146 and to the parallel inputs of the card address shift register 126 (FIG. 5). The counters 140 and 142 are adapted, through the logic selection circuits 144 and 146, to sequentially address the digital and analog data cards to gate the data thereon to the 'data' input of the data selector 116.

The data point address counter 140 is a three bit, modulo eight counter which is incremented by a combination of the FT and 4T timing and control signals applied through gate 162 to the clock input of the counter 140. The counter 140, upon recycling, is adapted to increment the card address counter 142 by one.

The data card address counter 142 modulo is established by a magnitude comparator 148 and a maximum card switch register 150. The comparator 148 has an A<C output connected through an inverter I1 to the clear inputs of the counters 140 and 142, one set of its parallel inputs connected to the parallel outputs C0-C6 of the card address counter 142, and the other set of its parallel inputs A0-A6 connected to the SPST switches 154 contained in the switch register 150. For reasons of clarity, only one switch 154 is shown. The C7 input of the comparator 148 is connected to binary HIGH and the A7 input is connected to the $\overline{Q}$ output of a toggling flip-flop 160 through a NAND gate G2. As in the case of the switch register 124, the switches 154 provide a binary 1 imput when open and a binary zero input when they are closed. The preselected binary number stored in the switch register 150, the comparator 148, and the flip-flop 160 cooperate as described below to cause the counters 140 and 142 to clear to zero at a predetermined card address during every other data cycle.

An analog data bit counter 156 is provided to increment the point address counter 140 when the transmitter 100 is addressing an analog data card. The analog data bit counter 156 is a modulo 16 counter which has its serial output connected to the serial input of the point address counter 140. The counter 156 is enabled by an ANACARD control signal, the source of which is described below, and incremented by a combination of the FT and 4T control signals applied to the clock input.

The strobe generator 158 is adapted to generate shift pulses, in response to a combination of the FT and 4T control signals, to shift the analog data bits out of the shift register on the analog data card.

Transmitter Data Cycle and Message Frame Operation

During the binary zero time interval, the parity/start flip-flop 114 is reset by a combination of the KT and 1T control signals and, concurrently therewith, the data selector 116 is enabled by the control signals AT, BT, and CT, to select its 'marker/start' input for routing to the 'data out' line. Since the parity/start flip-flop 114 is reset, the binary 1 at the $\overline{Q}$ output will appear on the 'data out' line. In this manner, the binary 1 marker bit is always provided in the binary zero bit position of each message frame. The KT and 1T control signal combination, in addition to resetting the parity/start flip-flop 114, is applied to the load input of the sync and checkword shift register 118 to load the preselected sync word from the sync word switch register 120 into the sync and checkword shift register 118.

Commencing with the second bit interval, bit position 1, and ending with bit position 8, the DT and 4T control signals are applied, respectively, to the clock enable and clock input of the sync and checkword shift register 118 thereby enabling the shift register 118 to shift the sync word out while the data selector 116 is concurrently enabled by the AT, BT, and CT control signals to select its 'sync/check' input and thereby route the sync word to the 'data out' line. Since the first bit position of the sync word switch register 120 is wired to ground, the first bit shifted out of the sync and checkword shift register 118 and, thus, the first bit of the sync word will be a binary 0. The binary 1 marker bit and the initial binary 0 in the sync word provide a binary 1 to binary 0 trailing edge transition between bit positions zero and one which is utilized, as described below, to enable and synchronize the receiver 200 to receive the message frame. As the sync word is shifted out during binary positions 1–8, the EXCLUSIVE OR circuit 122 compares the output of the sync and checkword shift register 118 with the 'data out' line. Since the two inputs will be identical, the EXCLUSIVE OR circuit 122 will apply a binary 0 to the serial input of sync and checkword shift register 118. As the sync word is shifted out by the intra-bit control signal 4T, the sync and checkword shift register 118 will fill with binary zeros generated by the EXCLUSIVE OR circuit 122.

Concurrent with the shifting of the sync word, the parity/start flip-flop 114, which was set by a combination of the HT and 1T control signals in bit interval 1, is enabled for toggling by a combination of the DT and 3T control signals applied to the C input. Whenever a binary 1 is shifted out of the sync and checkword shift register 118, the parity/start flip-flop 114 will toggle between its two states. If there are an even number of binary ones in the sync word, the flip-flop 114, at the end of bit position 8, will be set, and, if there are an odd number of binary ones in the sync word at the end of the bit position 8, the flip-flop 114 will be reset. At binary position 9, the data selector 116 is enabled by the control signals AT, BT and CT to select its 'parity' input and thereby route the Q output of the parity/start flip-flop 114 to the 'data out' line. If the total number of binary ones in the sync word is even, an additional binary 1 from the Q output of the set parity/start flip-flop 114 will be inserted in binary position 9 to provide odd horizontal parity. If the total number of binary ones in the sync word is odd, a binary 0 from the Q output of the reset parity/start flip-flop 114 will be routed by the data selector 116 to the 'data out' line to provide odd horizontal parity. In the next bit interval, bit position 10, the data selector 116 is enabled by the control signals AT, BT and CT to select its 'marker/start' input and thereby route the Q output of the parity/start flip-flop 114 to the 'data out' line. If the flip-flop 114 was set by an even number of binary ones in the sync word, the start bit in bit position 10 will be a binary 0, and if the parity/start flip-flop 114 was reset by an odd number of binary ones in the sync word, the start bit in binary position 10 will be a binary 1. As is apparent, the start bit is always the complement of the preceeding parity bit.

After the marker bit, the sync word, the sync word parity bit, and the start bit of the first data word DW 1 have been transmitted, the first eight bit data byte in bit positions 11–18 will be transmitted by the data card address section shown in FIG. 6.

The data cards and their respective data points are addressed in a successive serial manner by means of the data card selection logic 146 and data point selecion logic 144 operating in response to the binary address numbers contained in, respectively, the data card address counter 142, and the data point address counter 140.

The card address and the point address contained in the counters 142 and 140 for the transmission of the first message frame of the first data cycle are, respectively, 0000000 and 000. These initial addresses are obtained by clearing the counters 140 and 142 to zero. This is done by applying a RESET control signal to the clear inputs of the counters 140 and 142. The RESET control signal is generated by circuit means (not shown) at transmitter 100 turn on.

The initial data card and data point address is loaded, respectively, into the data card shift register 126 and the data point intermediate register 130 (FIG. 5) prior to the transmission of the first data byte during the binary interval zero by a combination of the KT and 1T control signals applied to the load inputs of the registers 126 and 130. The initial data card and data point address information is held in the registers 126 and 130 for insertion, respectively, into the first and second header words after the transmission of the data words.

The first data byte is transmitted during bit intervals 11 to 18, during which time the data selector 116 is caused to select, in response to its AT, BT, and CT control signals, its 'data' input for routing to the 'data out' line, and the point address counter 140 is incremented by ones in response to a combination of the FT and 4T control signals. As the point address counter 140 increments upward from its initial address, the selection logic 144 sequentially gates the eight data points on the addressed data card to the 'data out' line to transmit the first data byte. Thus, for bit positions 11-18, the point address counter 140 will increment from the initial point address of 000 through to 111 to gate the eight data points on the addressed data card to the 'data out' line. The point address counter then recycles to 000 to thereby increment the serially cascaded card address counter 142 by one to address the next successive data card. For the first message frame of the first data cycle, the card address counter will be incremented from 0000000 to 0000001 after the transmission of the first data byte in bit positions 11-18.

The parity/start flip-flop 114, concurrent with the transmission of the first data byte, functions to generate the appropriate parity and start bits. During bit intervals 19 and 20, the data selector 116 is enabled to select its 'parity' input and then its 'start' input to provide a parity bit for the first data word DW 1 and a complementary start bit for the second data word DW 2.

The second data byte is transmitted during bit intervals 21-28 during which time the data selector 116 is caused to select, in response to its AT, BT and CT control signals, its 'data' input for routing to the 'data out' line, and the point address counter 140 is incremented by ones in response to a combination of the FT and 4T control signals. As the point address counter 140 increments upward from its initial address, the selection logic 144 (FIG. 6) sequentially gates the eight data points on the next data card to the 'data out' line to transmit the second data byte. Thus, for bit positions 21-28, the point address counter 140 will increment from the point address of 000 through to 111 to gate the eight data points on the addressed data card to the 'data out' line. The point address counter then recycles to 000 to thereby increment the serially cascaded card address counter 142 by one to address the next successive data card. For the second data byte of the first message frame of the first data cycle, the card address counter will be incremented from 0000001 to 0000010 after the transmission of the second data byte in bit positions 21-28.

The parity/start flip-flop 114, concurrent with the transmission of the second data byte, functions to generate the appropriate parity and start bits. During bit intervals 29 and 30, the data selector 116 is enabled to select its 'parity' input and then its 'start' input to provide a parity bit for the second data word DW 2 and a complementary start bit for the third data word DW 3.

Commencing with bit interval 31 and ending with bit interval 49, the transmitter 100 functions to transmit the third and fourth data words, DW 3 and DW 4, in a manner identical to that described for transmission of the first and second data words, DW 1 and DW 2. The data point selection logic 144 and the data card selection logic 146, in response to the incrementing of the point address counter 140 and the card address counter 142, successively gate the data points on the next two successive data cards to the 'data out' line to form the third and fourth data bytes. After the transmission of the third data byte in bit positions 31-39, the card address counter 142 will be incremented by the point address counter 140 from 0000010 to 0000011, and after the transmission of the fourth data byte in the bit positions 41-49, the card address counter will be incremented by the point address counter 140 to 0000100. This last card address then forms the basis for the first data byte of the next successive message frame transmitted.

The parity/start flip-flop 114, concurrent with the transmission of the second and third data bytes, functions to generate the appropriate parity bits for bit positions 49 and 59 and the complementary start bits for bit positions 50 and 60. The data selector 116 is enabled by its AT, BT and CT control signals to select its 'parity' input in bit positions 49 and 59 and its 'marker/start' input in positions 50 and 60 to provide the parity and start bits for these bit positions.

The error bit generator shown in FIG. 5 and consisting of the EXCLUSIVE OR circuit 136 and the NAND gate 138 functions during the transmission of the four data bytes to generate an error output at the gate 138 in response to degradations of the POWER, DATA and $\overline{\text{DATA}}$ voltage levels. The data word error bit decoder 134 has its selection inputs, C0 and C1, connected, respectively, to the C0 and C1 outputs of the data card address counter 142 (FIG. 6). The decoder 134, as enabled by the control signals C0 and C1, will route an error bit output from the NAND gate 138 to one of the four error bits storage latches RS1-RS4. During the transmission of the first data byte, the output of the NAND gate 138 will be routed by the error bit decoder 134 to the S input of the first latch RS1. Should an error bit occur, the latch RS1 will be set. In an analogous manner, the decoder 134 will route error bits occurring during the transmission of the second, third and fourth data bytes to, respectively, the second latch RS2, the third latch RS3, and the fourth latch RS4.

After the four data words have been transmitted, a combination of the FT and 3T control signals applied to the load input of the shift register 128 simultaneously loads, respectively, the point address contents and error bit contents of the point address intermediate register 130 and the error bit register 132 into the shift register 128. Thus, at bit position 50, the card address shift register 126 contains the initial card address for the first data byte which was loaded in bit interval 0 by a combination of the KT and 1T control signals; and the serially cascaded shift register 128 contains the initial point address for the first data byte and the error bit information for the four data bytes. The contents of these two shift registers, 126 and 128, constitute the information contents of the first and second header words.

Commencing with bit position 51 and ending at bit position 58, the shift registers 126 and 128, as enabled and shifted, respectively, by the ET and 4T control signals, shift the initial card address information out of the shift register 126 to transmit the first header word. Concurrently therewith, the data selector is enabled by its AT, BT, and CT control signals to select its 'header' input for routing to the 'data out' line.

As the card address information for the first header word is shifted out, the parity/start flip-flop 114 functions to generate the appropriate parity and complementary start bits. During bit intervals 59 and 60, the data selector 116 is enabled to select its 'parity' and then its 'start' input to provide a parity bit for the first header word and a complementary start bit for the second header word.

Commencing with bit position 61 and ending at bit position 68, the cascaded shift registers 126 and 128, as enabled and shifted, respectively, by the ET and 4T control signals, shift the initial point address information and error bit information out of the shift registers 126 and 128 to transmit the second header word. Concurrently therewith, the data selector is enabled by its AT, BT, and CT control signals to select its 'header' input for routing to the 'data out' line.

As the card address information for the second header word is shifted out, the parity/start flip-flop 114 functions to generate the appropriate parity and complementary start bits. During bit intervals 69 and 70, the data selector 116 is enabled to select its 'parity' and then its 'start' input to provide a parity bit for the second header word and a complementary start bit for the checkword.

After the transmission of the second header word and the start bit of the checkword, the data selector 116 is enabled by its timing and control signals AT, BT, and CT to select its 'SYNC/CHECK' input to begin transmission of the checkword.

Beginning with the transmission of the first data byte, the EXCLUSIVE OR circuit 122 (FIG. 5) compared the output of the 'data out' line with the output of the sync and checkword shift register 118 and entered its EXCLUSIVE OR result into the shift register 118 serial input. Since the sync and checkword shift register 118 contained all zeros after the transmission of the sync word, the first data byte was entered into the shift register 118 by the EXCLUSIVE OR circuit 122. The EXCLUSIVE OR circuit 122 then, in a successive manner, compared the second data byte with the first data byte; compared the third data byte with the EXCLUSIVE OR result of the second and first data bytes; compared the fourth data byte with the EXCLUSIVE OR result of the third, second, and first data bytes; compared the first header word information with the EXCLUSIVE OR result of the fourth, third, second, and first data bytes; and, finally, compared the second header word information with the EXCLUSIVE OR result of the previous words in the message frame. This final EXCLUSIVE OR result constitutes the message frame checkword representing columnar or vertical parity between the corresponding bit positions of the previous words in the message frame. An example of the checkword formation is illustrated in FIG. 7 which shows four exemplary data words DW 1, DW 2, DW 3, and DW 4, two exemplary header words, the intermediate results, and the final checkword.

Commencing with bit position 71 and ending with bit position 78, the sync and checkword shift register 118 is enabled and shifted, respectively, by the DT control signal applied to the enable input and the 4T control signal applied to the clock input to shift the checkword to the 'data out' line through the appropriately enabled data selector 116. During the transmission of the checkword, the parity/start flip-flop 114 functions to generate a parity bit and a complementary start bit as described above. During the bit interval 79, the data selector 116 is enabled by its timing and control signals, AT, BT, and CT, to select its 'parity' input to insert the checkword parity bit in the bit position 79 and thereby conclude the transmission of the first message frame.

The frame interval counter 108 (FIG. 4), upon completion of the transmission of the first message frame, immediately recycles to begin the generation of another set of timing and control signals for the next message frame. The second and succeeding message frames are assembled and transmitted in the same manner as for the first message frame, except that they use and contain different initial data card addresses. The first message frame, as described above, had its initial data card address of 0000000 provided by the RESET control signal at transmitter 100 turn on. After the transmission of the four data bytes accessed from four successive data cards, the data card address was incremented by ones to 0000100. The second message frame uses this initial data card address for insertion in its first header word and as a basis for successively addressing the next four data cards in the data unit 14 and thereby increment the data card address to 0001000. Thus, the initial data card address is incremented by the binary equivalent of four for each successive message frame transmitted.

After the card address counter 142 increments through and addresses all the digital data cards in the data unit 14, the first analog data card will be addressed. When an analog data card is addressed, it generates an ANACARD signal which is applied to the 'analog' line (FIG. 6) to the gate 162 and to the analog data bit counter 156. The ANACARD signal inhibits the control signals FT and 4T from incrementing the point address counter 140 and concurrently enables the analog data point counter 156 to increment in response to the combined FT and 4T control signals. The strobe generator 158, in response to the combined FT and 4T control signals, generates pulses which are applied over the 'strobe' line to shift the contents of the analog data card shift register (not shown) to the 'data' input of the appropriately enabled data selector 116.

The analog data bit counter 156 is a modulo 16 counter and, when enabled by the ANACARD signal, increments in response to the combined FT and 4T control signals which are simultaneously used to generate the analog data card shift register shift pulses by the strobe generator 158. Thus, the analog data bit counter 156 counts the analog data bits as they are shifted to the 'data' line. When all 16 analog data bits of the addressed analog data point have been shifted by the strobe pulses, the analog data bit counter 156 increments the point address counter 140 by one to address the next analog data point.

The analog message frames are formed in the same manner as described above for the digital message frames. For the first analog data point addressed, the first group of eight analog data bits are inserted in bit positions 11-18 of the analog data word 1A and the second group of eight analog data bits are inserted in the bit positions 21-28 of the analog data word 1B. For the second analog data point addressed, the first group of eight analog data bits are inserted in the bit positions 31-38 of the analog data word 2A and the second group of eight analog data bits are inserted in the bit positions 41-48 of the analog data word 2B.

As described above, the modulo two flip-flop counter 160 is provided to inhibit the transmission of analog data frames every other data cycle. The flip-flop 160 is reset by the RESET signal applied to the R input and enabled for toggling by the binary HIGH connection to the J and K inputs. A NAND gate G2 has one of its inputs connected to the $\overline{Q}$ output of the flip-flop 160 and the other of its inputs connected to the 'analog' line. The output of the NAND gate is connected to the comparator 148 as described below. The comparator 148 has two sets of eight bit binary number inputs, the A0–A7 inputs, and the C0–C7 inputs, and a A<C output which is connected to the clear inputs of both the point address counter 140 and the card address counter 142 through an inverter I1. The A<C output remains HIGH when A<C and is LOW when A=C or A>C. The counters 140 and 142 are cleared to zero whenever A<C. The A0–A6 inputs are connected to the seven parallel outputs of the switch register 150 and the 8th bit position, that is, the $2^8$ A7 input is connected to the output of the NAND gate. Whenever the NAND gate G2 applies a binary 1 to the A7 input, the comparator 148 will see a binary number at its A0–A7 inputs equal to the sum of the 128 number at the A7 input and binary number set in the switch register 150. Whenever the NAND gate G2 applies a binary 0, the comparator 148 will see the binary number at its A0–A7 inputs equivalent to the number set in the switch register 150. The C0–C6 inputs are connected to the first seven bit positions of the card address counter 142 output and the 8th bit position, that is the $2^8$ C7 position is connected to binary HIGH. This binary HIGH provides the binary equivalent of 128 to the comparator 148 C0–C7 inputs such that the comparator 148 sees a number ranging between the 128 when the card address counter 142 is 0000000 to 255 when the card address counter 142 address has incremented to 1111111 and is about to recycle.

For the first data cycle, the flip-flop 160 is reset by the RESET control signal applied to the R input. The binary 1 at the $\overline{Q}$ output of the reset flip-flop 160 is applied to the NAND gate G2 along the binary 0 $\overline{ANACARD}$ signal. The binary 1 from the NAND gate G2 is then applied to the A7 input of the comparator 148. During the digital message frame portion of the first data cycle, the card address counter 142 will address the digital cards while the comparator 148 is comparing the A0–A7 inputs to the C0–C7 inputs. The A0–A7 inputs will be equal to the binary sum of 128 (binary 1 at the A7 input) plus the binary number set in the switch register 150. The C0–C7 inputs will be equal to the binary sum of 128 (binary HIGH at the C7 input) plus the C0–C6 card address which increments from zero to 127 during each full data cycle. As the card address C0—C6 increments from 0000000, the digital data cards will be addressed and their information contents inserted into digital message frames. After all the digital cards have been addressed, the first analog data card will be addressed and provide an ANACARD signal to the C input of the flip-flop 160 and to the NAND gate G2. In response to the ANACARD signal, the NAND gate G2 output will change from binary 1 to binary 0 and remove the binary 1 from the A7 input. Since the A7 input is at binary zero, the A0–A7 inputs will be 128 less than the C0–C7 inputs and the A<C output will go HIGH providing a binary 0 to the clear inputs of the counters 140 and 142 to immediately clear these counters to zero to terminate the data cycle without addressing the analog data cards. When the counters 140 and 142 are cleared, the address is removed from the first analog card removing the ANACARD signal from the C input of the flip-flop 160 to cause this flip-flop to toggle to its set state.

During the next data cycle, the binary 0 at the $\overline{Q}$ output of the set flip-flop 160 is applied to the NAND gate G2 along with the binary 0 ANACARD signal causing a binary 1 to be applied by the NAND gate G2 to the A7 input of the comparator 148. During the digital message frame portion of the next data cycle, the card address counter 142 will address the digital cards while the comparator 148 continues to compare its A0–A7 inputs to its C0–C7 inputs. The A0–A7 inputs will be equal to the binary sum of 128 (binary 1 at the A7 input) plus the binary number set in the switch register 150. The C0–C7 inputs will be equal to the binary sum of 128 (binary HIGH at the C7 input) plus the C0–C6 card address which increments from zero to 127 during each full data cycle. As the card address C0–C6 increments up from 0000000, the digital data cards will be addressed and their information contents inserted into digital message frames. After all the digital cards have been addressed, the first analog data card will be addressed and provide an ANACARD signal to the C input of the flip-flop 160 and to the NAND gate G2. Because of the binary 0 at the $\overline{Q}$ output of the set flip-flop 160, the NAND gate G2 does not change its binary 1 output to the A7 input. Thus, A0–A6 will be greater than C0–C6 allowing the counter 142 to address through the analog data cards to provide analog message frames. When the card address counter 142 counts to the number set in the switch register and recycles to the next higher number, the C0–C6 inputs exceeds the A0–A6 inputs to the cause the comparator 148 A<C output to go HIGH, thereby clearing the counters 142 and 140 to terminate the data cycle and initiate the next successive data cycle. In this way, the flip-flop 160, the comparator 148, and the switch register inhibit analog message frames every other data cycle.

The Receiver Circuitry

Figure 9:
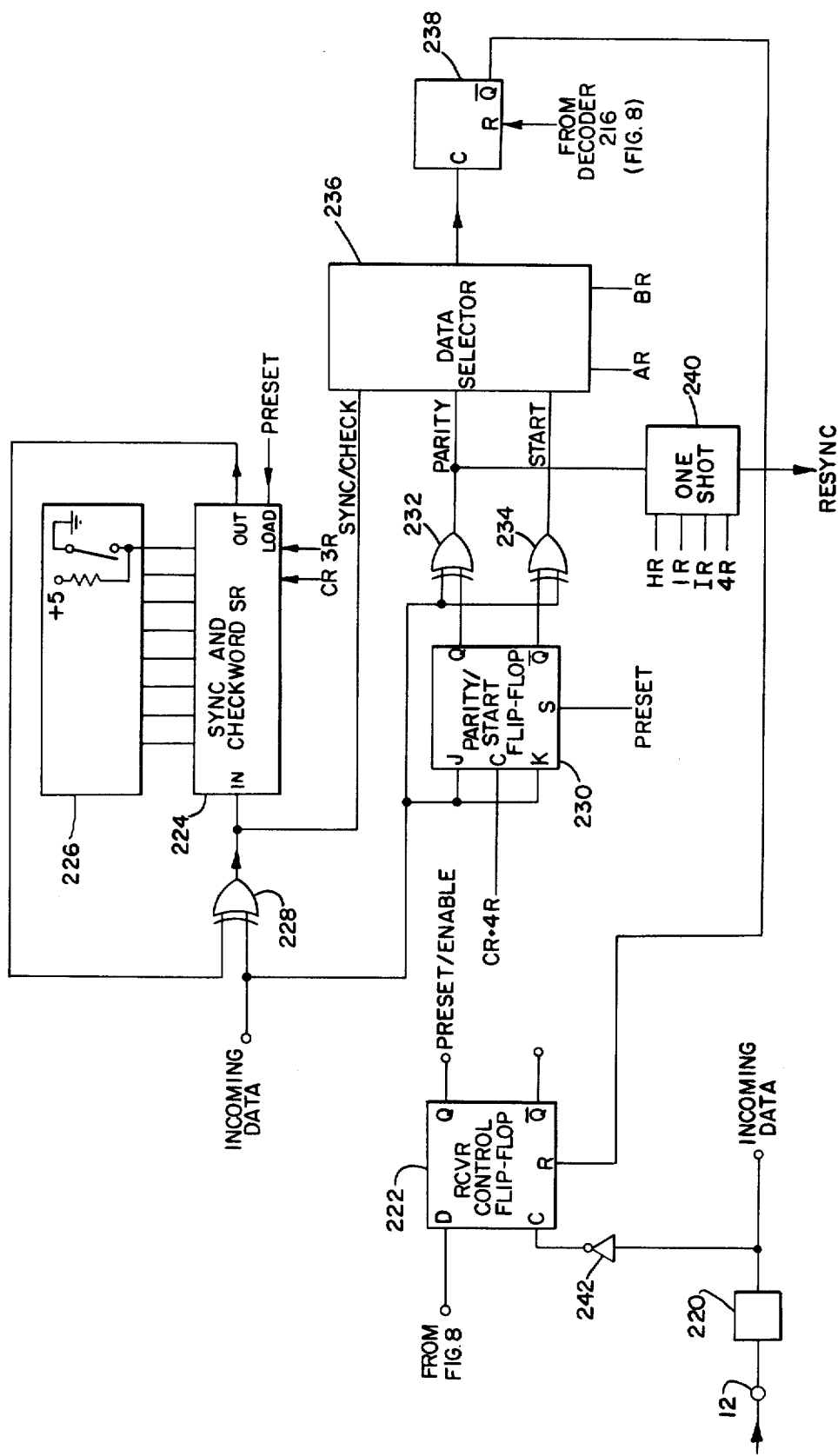
FIG. 9 is a functional block diagram of the parity-/start and sync and checkword section of the receiver illustrated in FIG. 1.
Figure 10:
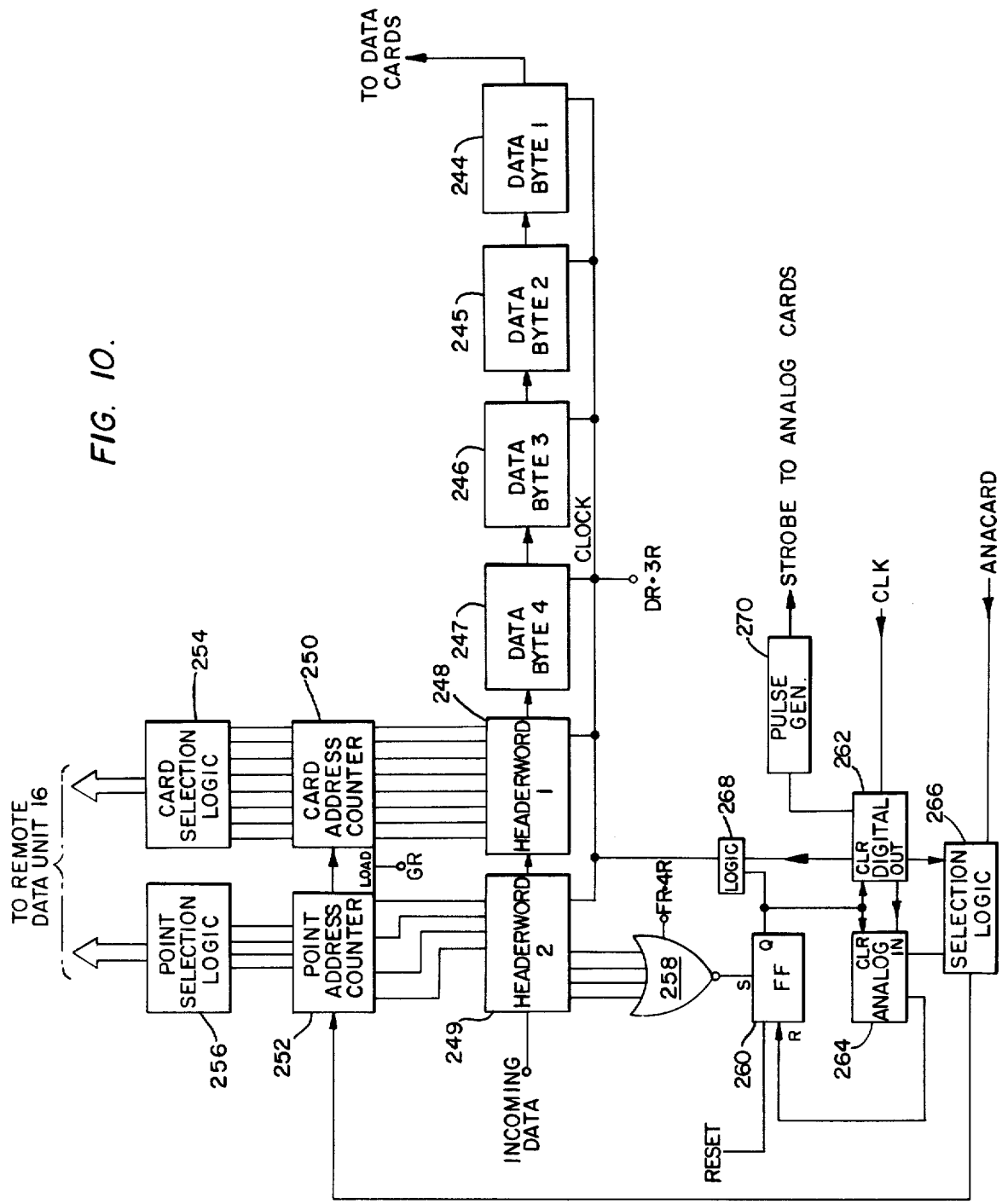
FIG. 10 is a functional block diagram of the data storage and control section of the receiver illustrated in FIG. 1.

The receiver 200 includes a timing and control signal section (FIG. 8), a sync and checkword section (FIG. 9), and a data and header word storage section (FIG. 10).

The receiver 200 timing and control signal section (FIG. 8) is similar to the transmitter 100 control signal section (FIG. 4) and includes a clock 202 which provides a train of clock pulses at the same pulse repetition rate as the transmitter clock 102 (9.85 MPPS). The clock pulses are inputted to a frequency divider 204 which in turn increments an intra-bit counter 206 serially cascaded with a frame interval counter 208. The outputs of the counters 206 and 208 are connected, respectively, to a decoder 210 and a decoder 212. The counter 206 is adapted to recycle each bit interval with the decoder 210 providing four intra-bit outputs 1R, 2R, 3R, and 4R each binary interval. Each intra-bit output occupies one-quarter of a bit interval. The counter 206 may be cleared to zero at any time during its sequencing by a RESYNC signal applied to its clear input. The counter 208 is adapted to recycle each 80 bit frame interval with the decoder 212 providing the timing and control signals AR, BR, CR, DR, FR, GR, HR, and IR. These timing and control signals are illustrated in FIGS. 3B and 3B' in vertical registration with the bit positions of the message frame of FIGS. 3 and 3'. The decoder 212 is adapted to be held or maintained in a preset state prior to and during bit interval 0 by an appropriate control signal applied to the preset input of the counter 208.

The clock pulse output of the clock 202 is also inputted to a frequency divider 214 which in turn drives a decoder 216. The frequency divider 214 is adapted to divide each binary interval into eight sub-intervals. The decoder 216 is adapted to recognize the 7th sub-interval and reset a latch 218 and a flip-flop 238 described below. The reset latch 218 provides an enable signal to the receiver control flip-flop 222 described below. The frequency divider 214 is adapted to be held in its reset to zero state prior to the reception of the incoming marker bit by the $\bar{Q}$ output of the receiver control flip-flop, described below, and enabled for dividing by a combination of the $\bar{Q}$ output of the receiver control flip-flop and the marker bit applied to the frequency divider 214 enable input through a logic gate G1. This same signal combination is also applied to the S input of the latch 218 to set this latch when the marker bit is first received.

As in the case of the transmitter 100, the decoders 210 and 212 may take the form of appropriately microprogrammed read only memories (ROM) and the various outputs of the decoders 210 and 212 may be inputted to various inverters, AND, and OR gates (not shown) in a conventional manner to provide various NOT, sum of the products, and product of the sums control signals. The timing and control signals are utilized by the receiver 200 circuitry shown in FIGS. 9 and 10 to selectively enable or inhibit various devices to permit the receiver 200 to validate the various message frames and update the data cards in the data unit 16.

The sync and checkword section (FIG. 9) includes an optical coupler 220, a receiver control flip-flop 222, a sync and checkword shift register 224, a sync word switch register 226, an EXCLUSIVE OR circuit 228, a parity/start flip-flop 230, a parity bit EXCLUSIVE OR circuit 232, a start bit EXCLUSIVE OR circuit 234, a data selector 236, a flip-flop 238, and a one shot monostable multivibrator 240.

The message frames are transmitted to the receiver 200 over the communication link 12 which is connected to an LED-phototransistor coupler 220. The output of the coupler 220, labeled 'incoming data', is connected to various devices in the receiver 200 as described below.

The receiver control flip-flop 222 is a D-type positive edge triggered flip-flop which is adapted, in response to appropriate controls, to provide a binary zero PRESET and binary 1 ENABLE signal at its Q output as well as the binary complement of these signals at its $\bar{Q}$ output. The D input of the receiver control flip-flop 222 is connected to the $\bar{Q}$ output of the latch 218 (FIG. 8) and the C input is connected to 'incoming data' through the inverter 242.

The sync word switch register 226, which is connected to the parallel inputs of the sync and checkword shift register 224, is adapted to store the preselected sync word in a manner similar to the switch register 120 of the transmitter 100 for loading into the sync and checkword shift register 118. The EXCLUSIVE OR circuit 228 has its output connected to the serial input of the sync and checkword shift register 224 and also to the 'sync/check' input of the data selector 236. An input of the EXCLUSIVE OR circuit 228 is connected to the 'incoming data' line and the other input is connected to the serial output of the sync and checkword shift register 224.

The parity/start flip-flop 230 is a J-K type flip-flop provided to generate parity and start bits for comparison with the 'incoming data' parity and start bits. The comparison between the incoming parity bits and the parity bits generated by the flip-flop 230 is accomplished by the EXCLUSIVE OR circuit 232, and the comparison between the incoming start bits and the start bits generated by the flip-flop 230 is accomplished by the EXCLUSIVE OR circuit 234. The Q output of the parity/start flip-flop 230 is connected to one input of the EXCLUSIVE OR circuit 232 and the $\bar{Q}$ onput is connected to one input of the EXCLUSIVE OR circuit 234. The other inputs of the EXCLUSIVE OR circuits 232 and 234 are connected, as are the J and K inputs of the parity/start flip-flop 230, to the 'incoming data' line. The output of the EXCLUSIVE OR circuit 232 connects to the 'parity' input line of the data selector 236 and to the trigger input of the one shot multivibrator 240. The output of the other EXCLUSIVE OR circuit 234 is connected to the 'start' input of the data selector 236. The data selector 236 is enabled by the control signals AR and BR to select one of its input lines and route the selected input to the data selector 236 output which in turn is connected to the message termination flip-flop 238. The $\bar{Q}$ output of the flip-flop 238 is connected to the receiver control flip-flop 222 R input.

The data word storage section (FIG. 10) includes serially cascaded shift registers 244, 245, 246, 247, 248, and 249 which are adapted to store, respectively, the first, second, third, and fourth data bytes, the card address information in the first header word, and the point address and error bit information in the second header word. The parallel load inputs of a card address counter 250 are connected to the parallel inputs of the shift register 248 and the point address bit positions of the shift register 249 are connected to the parallel inputs of a point address counter 252. The binary address information in the shift registers 248 and 249 is loaded, respectively, into the counters 250 and 252 by the GR timing and control signal applied to the load input of these counters. The parallel outputs of the counters 250 and 252 are connected, respectively, to the data card and the data point selection logic circuits 254 and 256. These selection circuits, 254 and 256, in response to the counters 250 and 252, are adapted to sequentially address the data cards and their respective data points in the data unit 16.

A quad NOR gate 258 which may be enabled by a combination of the FR and 4R control signals, is connected to the last four bit positions of the second header word shift register 249 with the output of the NOR gate 258 inputted to a data readout control flip-flop 260.

The readout of the data in the shift registers 244–249 to the data cards in the data unit 16 is controlled by the read out control flip-flop 260, the digital read out counter 262, the analog read out counter 264, and the digital-analog selection logic 266. The digital read out counter 262 is adapted to receive clock pulses from the timing and control secion (FIG. 8) and divide the pulses to provide high speed shift pulses to the shift registers 244–249 through the gate 268; high speed shift pulses to shift the analog data card shift register in the data unit 16; and incrementing pulses for the serially cascaded point address and card address counters 252 and 250 through the digital-analog selection logic 266. The counter 264 is adapted to receive its input pulses from the counter 262 and supply incrementing pulses through the selection logic 266 to the point address counter 252. The selection logic 266 operates in response to a signal, either as $\overline{\text{ANACARD}}$ or an ANACARD signal, issued by the selected data card in the data unit 16. If the selected data card is a digital data card, the selection logic 266, in response to the $\overline{\text{ANACARD}}$ signal, directs the output of the digital read out counter 262 to the serial input of the point address counter 252, and if the selected card is an analog data card, the selection logic 266, in response to the ANACARD signal, directs the output of the analog read out counter 264 to the serial input of the point address counter 252.

Receiver Message Frame and Data Cycle Operation

Prior to binary interval zero, the receiver 200 is maintained in a preset state by the reset receiver control flip-flop 222. The Q output of the flip-flop 222 is applied to the frame interval counter 208 (FIG. 8) to initialize the counter 208 such that a binary one is applied to the decoder 212 to provide the timing and control signals illustrated in FIGS. 3B and 3B' for binary interval one; to the load input of the sync and checkword shift register 244 to load the predetermined sync word from the sync word switch register 226 into the shift register 224; and to the S input of the parity/start flip-flop 230 to set this flip-flop. The $\overline{Q}$ output of flip-flop 222 of FIG. 9 is applied through a gate G1 (FIG. 8) to the enable input of the frequency divider 214 to inhibit this divider from functioning and to the S input of the latch 218 to set this latch. The binary zero from the $\overline{Q}$ output of the set latch 218 is applied to the D input of the receiver control flip-flop 222.

When an incoming message frame arrives over the communications link 12, the marker bit is combined through gate G1 (FIG. 8) with the $\overline{Q}$ output of the reset receiver control flip-flop 222 to the enable input of the frequency divider 214 and to the S input of the latch 218 to set the latch when the marker bit is first received. The complement of the marker bit is applied to the C input of the receiver control flip-flop 222 through inverter 242 (FIG. 9). The enabled frequency divider 214, in response to its clock signal input, divides each binary interval into eight sub-intervals. The decoder 216 recognizes the counter output corresponding to a ⅜th of the bit interval zero, and applies a pulse to the reset input of the latch 218. The latch 218, when reset, applies a binary 1 to the D input of the receiver control flip-flop (FIG. 9). When the complement of the marker bit binary 1 to binary 0 signal level transition is applied to the C input, the receiver control flip-flop 222 is triggered to its set state to provide a binary 1 ENABLE signal at its Q output and the complement of this signal at its $\overline{Q}$ output. In response to the signals, the sync and checkword shift register 224 is enabled, and the frame interval counter 208 (FIG. 8) is enabled to begin counting from the initial count of one and thereby permit the decoder 212 to provide the frame interval timing and control signals of FIGS. 3B and 3B'.

During binary intervals 1-8, the sync word loaded into the shift register 224 is shifted out by a combination of the CR and 3R timing and control signals. The EXCLUSIVE OR circuit 228 compares the bits of the incoming sync word with the corresponding bits of the stored sync word. If the compared bits are the same, the EXCLUSIVE OR circuit 228 provides a binary 0 to the serial input of the sync and checkword shift register 224. If all the bits of the incoming sync word match the stored sync word, the shift register 224 will be filled by binary zeros at binary position 8. Concurrent with the sync word comparison, the data selector 236 is enabled by the timing and control signals AR and BR to select its 'sync/check' input for routing to the data selector 236 output. If a mismatch is detected by the EXCLUSIVE OR circuit 228 between the incoming sync word and the stored sync word, a binary 1 will appear at the output of the data selector 236. This binary 1 is applied to the C input of the message termination flip-flop 238 to cause the flip-flop 238 to reset. The binary 1 at the $\overline{Q}$ of the flip-flop 238 is applied to the R input of the receiver control flip-flop 222 to reset this flip-flop. The Q and $\overline{Q}$ signals of the reset receiver control flip-flop 222 return the receiver 200 to its preset state in the following manner. The Q output signal is applied to the frame interval counter 208 to initialize the counter 208 such that a binary one is applied to the decoder 212 to provide the timing and control signals illustrated in FIGS. 3B and 3B' for binary interval one; to the load input of the sync and checkword shift register 224 to reload the sync word from the sync word switch register 226 into the shift register 224; and to the S input of the parity/start flip-flop 230 to set this flip-flop. The $\overline{Q}$ output is applied through the gate G1 to the enable input of the frequency divider 214 to enable this divider and to the S input of the latch 218 to set this latch upon receipt of the next marker pulse.

During the binary intervals 1-8, when the incoming sync word is being compared, the parity/start flip-flop 230 is enabled for toggling by a combination of the CR and 4R control signals applied to the C input of the flip-flop 230. In a manner identical to that described for the transmitter 100 parity/start flip-flop 114 (FIG. 5), the flip-flop 230 changes state whenever a binary 1 in the incoming sync word is applied to the J and K inputs. If ther are an even number of binary ones in the incoming sync word, the parity/start flip-flop 230 will be in its initial set state at binary position 8, and if there are an odd number of binary ones in the incoming sync word, the parity/start flip-flop 230 will be in its reset state. Thus, the Q output of the parity/start flip-flop 230 provides an internally generated parity bit indication, and the $\overline{Q}$ output provides an internally generated start bit indication which is the complement of the parity bit.

The parity EXCLUSIVE OR circuit 232 compares the incoming parity bit in bit position 9 with the parity bit generated by the parity/start flip-flop 230. During bit interval 9, the control signals AR and BR enables the data selector 236 to select its 'parity' input and thereby route the output of the EXCLUSIVE OR circuit 232 to the flip-flop 238. Should a mismatch be detected between the parity bit generated by the parity/start flip-flop 230 and the incoming parity bit, a binary 1 will be applied through the data selector 236 and the flip-flop 238 to the receiver control flip-flop 222 to terminate the reception of the message and return the receiver 200 to the PRESET state as described above.

At the start of the first data word, bit position 10, the control signals AR and BR enable the data selector 236 to select its 'start' input and route the output of the start EXCLUSIVE OR circuit 234 to the flip-flop 238. The start EXCLUSIVE OR circuit 234 compares the incoming start bit in bit position 10 with the start bit generated at the $\bar{Q}$ output of the flip-flop 230. If a mismatch is detected, the receiver 200 is caused to terminate the reception of the message and PRESET in the manner indicated above.

The one shot multivibrator 240 is provided to generate a RESYNC signal between each word in the message frame to maintain synchronism between the receiver 200 timing and control section (FIG. 8) and the transmitter 100 timing and control section (FIG. 4). The one shot multivibrator 240 is of conventional design and is adapted to be selectively enabled by a combination of the IR control signal occurring at the parity bit positions of each word (bit positions 9, 19, 29, 39, 49, 59, 69, and 79) and the last quarter intra-bit control signal 4R; and the HR control signal occurring at the start bit positions of each word (bit positions 10, 20, 30, 40, 50, 60, and 70) and the first quarter intra-bit control signal 1R. The trigger input of the one shot multivibrator 240 is connected to the output of the parity EXCLUSIVE OR circuit 232. When the complementary parity and start bits occur at the end and beginning of the message words, the enabled one shot multivibrator 240 is triggered by a trigger pulse from the parity EXCLUSIVE OR circuit 232 to generate a RESYNC pulse of preselected duration at its output. The following two examples illustrate the trigger pulse formation.

If the incoming parity bit is a binary 1, the next bit, the complementary start bit, will be a binary 0. The EXCLUSIVE OR circuit 232 will compare the incoming binary 1 parity bit with the binary 1 generated at the Q output of the parity/start flip-flop 230 and provide a binary 0 output during the parity bit interval which indicates that the incoming and internally generated parity bits are the same. In the next bit position, the complementary start bit position, the EXCLUSIVE OR circuit 232 will compare the complementary binary 0 start bit with the binary 1 at the Q output of the parity/start flip-flop 230 and provide a binary 1 output which is utilized to trigger the one shot multivibrator 240 to generate the RESYNC signal. Conversely, if the incoming parity bit is a binary 0, the next bit, the complementary start bit, will be a binary 1. The EXCLUSIVE OR circuit 232 will compare the incoming binary 0 parity bit with the binary 0 generated at the Q output of the parity/start flip-flop 230 and provide a binary 0 output during the parity bit interval which indicates that the incoming and internally generated parity bits are the same. In the next binary position, the complementary start bit position, the EXCLUSIVE OR circuit 232 compares the complementary binary 1 start bit with the binary 0 at the Q output of the parity/start flip-flop 230 and provides a binary 1 output which is then utilized to trigger the one shot 240 to generate the RESYNC signal.

The RESYNC pulse is applied to the clear input of the intra-bit counter 206 (FIG. 8) to clear the counter to 0 and thereby restart and resynchronize the intra-bit counter 206 at the beginning of each word in the message frame. The intra-bit counter 206 is a modulo 256 counter with the last two bit positions, that is, the last two least significant bits, utilized to drive the decoder 210. Thus, when the intra-bit counter 206 is resynchronized between message words, it will be resynchronized within 1/256 of a bit position. The frame interval counter 208 is indirectly synchronized by virtue of its serially cascaded relationship with the directly resynchronized intra-bit counter 206.

If a mismatch is not detected in the incoming sync word, its parity bit, or the start bit of the first data word, as described above, the first data byte in bit positions 11-18 is shifted into the serially cascaded shift registers 244-249 by a combination of the DR and 3R control signals. As the first data byte is shifted, the parity/start flip-flop 230 is functioning as described above to generate appropriate complementary parity and start bits, and the EXCLUSIVE OR circuit 228 is functioning to generate a checkword intermediate result for shifting into the sync and checkword shift register 224. The EXCLUSIVE OR circuit 228 compares the 'incoming data' line with the output of the sync and checkword shift register 224 and enters its output into the shift register 224 serial input. Since the sync and checkword shift register 224 contains all zeros after the reception and comparison of the sync word, the first data byte, in bit positions 11-18, is entered into the shift register 224 by the EXCLUSIVE OR circuit 228.

At bit positions 19 and 20, the data selector 236 is enabled by the timing and control signals AR and BR to successively select its 'parity' and then its 'start' inputs for routing to the flip-flop 238. During bit position 19, the parity EXCLUSIVE OR circuit 232 compares the incoming parity bit in bit position 19 with the parity bit generated at the Q output of the parity/start flip-flop 230. Should a mismatch be detected between the parity bit generated by the parity/start flip-flop 230 and the incoming parity bit, a binary 1 will be applied through the data selector 236 and the flip-flop 238 to the receiver control flip-flop 222 to terminate the reception of the message frame and return the receiver 200 to the PRESET state. At the transition between the parity bit in bit position 19 and the complementary start bit in bit position 20, the EXCLUSIVE OR circuit 232 initiates a trigger pulse, as described above, to trigger the one shot multivibrator 240 to generate its RESYNC signal to resynchronize the intrabit counter 206. During bit interval 20, the start EXCLUSIVE OR circuit 234 compares the incoming start bit in bit position 20 with the start bit generated at the $\bar{Q}$ output of the parity/start flip-flop 230. Should a mismatch be detected between the start bit generated by the parity/start flip-flop 230 and the incoming start bit, a binary 1 will be applied through the data selector 236 and the flip-flop 238 to the receiver control flip-flop 222 to terminate the reception of the message frame and return the receiver 200 to the PRESET state.

In a manner identical to that described above for the first data word, the data bytes of the second, third and fourth data words will be shifted into the shift registers 244-249; their respective parity and start bits will be compared with the parity and start bits generated by the parity/start flip-flop 230; and the intra-bit counter 206 will be resynchronized between the data words. In addition, the EXCLUSIVE OR circuit 228, in a successive manner, will compare the corresponding bits of the second data byte with the first data byte; compare the third data byte with the EXCLUSIVE OR result of the second and first data bytes; compare the fourth data byte with the EXCLUSIVE OR result of the third, second, and first data bytes and load an intermediate EXCLUSIVE OR result into the sync and checkword shift register 224.

After the data bytes are shifted into the shift registers 244-249, the card address information of the first header word and the point address and error bit information of the second header word are shifted into the shift registers 244-249. In the manner described above, the incoming parity and start bits of the first and second header words are compared with the internally generated parity and start bits. In addition, the EXCLUSIVE OR circuit 228, in a successive manner, will compare the corresponding information bits of the first header word with the previously generated EXCLUSIVE OR result of the fourth, third, second and first data word, and will compare the information bits of the second header word with the EXCLUSIVE OR results of the previous words in the message frame and enter the final EXCLUSIVE OR result, the checkword, into the sync and checkword shift register 224.

Commencing at bit position 71 and continuing until bit position 78, the data selector 236 is enabled by its control signals AR and BR to select its 'sync/check' input and the corresponding bits of the incoming checkword and the checkword stored in sync and checkword shift register 224 are compared, bit by bit, by the EXCLUSIVE OR circuit 228. The reception of the incoming message frame will be terminated and the receiver 200 will be returned to its PRESET condition if a mismatch is detected between the incoming checkword and the internally generated checkword in the same manner as described above.

During the bit interval 79, the data selector 236 is enabled by its timing and control signals AR and BR to select its 'parity' input while the EXCLUSIVE OR circuit 232 compares the incoming checkword parity bit with the internally generated parity bit at the Q output of the parity/start flip-flop 230. Should a mismatch be detected, the receiver 200 will be returned to its PRESET condition as previously indicated.

The error bits in the incoming message frame are stored in the first four bit positions of the shift register 249. As described above, these bit position outputs are connected to the inputs of the quad NOR gate 258 which is enabled by a combination of the FR and 4R control signals at the bit position 79. If an error bit is transmitted with the incoming data, the NOR gate 258, when enabled, will not cause the data to be read out.

The read out of the data in the shift registers 244-247 is controlled by the read out flip-flop 260, the analog data bit counter 264; the digital data bit counter 262, and the selection logic 266. The data read out flip-flop 260 is initially placed in its reset state by the RESET control signal applied to its R input. In this state, a binary 0 at the Q output is applied to the clear inputs of the serially cascaded digital data bit counter 262 and the analog data bit counter 264 to hold these two counters in their cleared to zero states and to the logic gate 268 which is thereby inhibited. In the bit position 79, the NOR gate 258 is enabled by a combination of the FR and 4R control signals to respond to the binary error bit information in the bit positions 65-68. If there are no error bits in the received message frame, the NOR gate 258 will trigger the read out flip-flop 260 to its set state to apply a binary 1 from the Q output to the clear inputs of the digital data bit counter 262 and the analog data bit counter 264 to thereby allow these two counters to increment in response to the clock signals. The flip-flop 260 upon being set also enables logic gate 268.

If a digital data card is being addressed, the $\overline{\text{ANACARD}}$ signal presented to the selection logic 266 causes the output pulses from the digital data bit counter 262 to be directed to the point address counter 252 to increment this counter. The digital data bit counter 262 will increment the point address counter 252 to successively address data points and data cards in the data unit 16, and generate and provide shift pulses through the logic gate 268 to shift the data bits out of the shift register 244-247 as the data points and data cards are being addressed. When 32 digital bits have been shifted, the read out flip-flop 260 is reset by a signal from the analog bit counter 264. The reset flip-flop 260 clears both counters 262 and 264, inhibits the logic gate 268 and terminates the digital data read out.

If the data card being addressed is an analog data card, the ANACARD signal presented to the selection logic 266 will direct count pulses from the analog data bit counter 264 to the point address counter 252 to increment this counter. The analog data bit counter 264 will increment the point address counter 252 to successively address data points and data cards in the remote data unit 16. The counter 262 will at the same time generate and provide shift pulses applied through the logic gate 268 to shift the data bytes out of the shift registers 244-247, and generate shift pulses through the pulse generator 270 for application to the analog data card shift register. Because 16 analog data bits must be read into each analog data point as compared to one digital data bit for each digital data point, the analog data bit counter 264 is adapted to divide the output of the digital data bit counter 262 by a factor of 16. When 32 analog bits have been shifted out of the shift registers 244-247, the read out flip-flop 260 is reset by a signal from the analog data bit counter 264 applied to its R input to thereby clear both counters 262 and 264, inhibit the logic gate 268, and terminate the data read out. The clock divide rates of the digital data bit counter 262 and the analog data bit counter 264 are such that the data bytes in the shift registers 244-247 are read out at a high speed when compared to the rate the data bytes were read into the registers 244-247 by the combined DR and 3R control signals.

If there were any error bits transmitted in the incoming message frame, the NOR gate 258 output will not set the flip-flop 260 which in turn will not enable the digital data bit counter 262 or the analog data bit counter 264, thus preventing any data read out.

The receiver is also provided with a time out indicator (not shown) to determine if message frame transmission time is excessive. The time out indicator includes a down counter which is loaded with a maximum time value, such as the time value equivalent to two message frames, at the beginning of each message frame. The counter is decremented by suitable clock pulses, and if the counter goes to zero, an excessive transmission time indication is provided.

As will be apparent to those skilled in the art, various changes and modifications may be made to the apparatus of the present invention without departing from the spirit and scope of the present invention as recited in the appended claims and their legal equivalent.

I claim:

1. A serial data transmission system comprising:
   a transmitter for transmitting serially arranged bits of binary information with each binary value being represented by a different signal level;
   a receiver for receiving said bits;
   an information carrying communications link extending between said transmitter and said receiver;
   means associated with said transmitter for arranging said binary bits transmitted by said transmitter in message frames having a preselected number of bit positions;

the first bit position of each of said message frames containing a marker bit having a predetermined binary value, the second bit positions of each of said message frames having a binary value opposite to that of said marker bit to provide a signal level transition between said first and second bit positions;

control means associated with said receiver in each message frame to said marker bit followed by a signal level transition between said first and second bit positions to the opposite binary value to enable said receiver to receive and respond to the remainder of the bits in each message frame unless enabled by said control means.

2. A serial data transmission system comprising:

a transmitter for transmitting serially arranged bits of binary information;

a receiver for receiving bits;

an information carrying communications link extending between said transmitter and said receiver; and means associated with said transmitter for forming a message frame having a plurality of serially arranged binary words which conclude and start, respectively, with a parity and a start bit;

the start bit in each succeeding binary word being complementary to the parity bit in the preceeding binary word, said parity bits having variable binary values to provide predetermined parity to said binary information.

3. The serial data transmission system claimed in claim 2, further comprising:

means associated with said receiver for detecting the transition between said complementary parity and start bits and for providing a signal indicating the detection thereof.

4. The serial data transmission system claimed in claim 3, wherein said detection signal is utilized to resynchronize a receiver clock.

5. The serial data transmission system claimed in claim 3, wherein said detection means comprises:

means associated with said receiver for generating a parity bit identical to the parity bit in each of said words of said message frame; and means associated with said receiver for comparing said receiver generated parity bit with the next successive start bit in said message frame;

said comparing means adapted to generate said detection signal in response to said complementary difference between said receiver generated parity bit and said message frame start bit.

6. The serial data transmission system claimed in claim 5, wherein said parity bit generating means comprises a bi-state device adapted to trigger between a set and a reset state for each binary 1 in a word;

said comparing means comprises an EXCLUSIVE OR gate adapted to compare the parity bit generated by said bi-state device with said next successive start bit in said message frame.

7. A serial data transmission system comprising:

a transmitter for transmitting serially arranged bits of binary information;

a receiver for receiving said bits;

an information carrying communications link extending between said transmitter and said receiver;

means associated with said transmitter for forming binary information transmitted by said transmitter into a message frame having as a first bit a binary 1 marker bit, a sync word immediately following said marker bit having predetermined binary bit values, a plurality of data words, at least one address information word containing address information for the first of said plural data words, and a checkword, each bit of said checkword corresponding to a different bit in at least two of said other message frame words and representing the EXCLUSIVE OR result of the corresponding bits of at least two of said other message frame words, said receiver including control means having a preset state and an enable state and being switchable from said preset state to said enable state in response to a marker bit received by said receiver, said receiver including verification means responsive to said control means being in said enable state to compare the word received by said receiver immediately following the switching of said control means to said enable state with said predetermined binary bit values, said verification means permitting the binary values of the bits of the data words in the message frame received by said receiver immediately following the switching of said control means to its enable state to be directed by said receiver to the address locations corresponding to the address information in the message frame received by said receiver immediately following the switching of said control means to said enable state if the word received by said receiver immediately following the switching of said control means to its enable state has said predetermined binary bit values, said verification mean resetting said control means to its preset state if the word received by said receiver immediately following the switching of said control means to its enable state does not have said predetermined binary bit values.

8. The serial data transmission system of claim 7, wherein said message frame further comprises:

a start bit preceeding at least one of said words and a parity bit concluding at least one of said words.

9. The serial data transmission system of claim 7, wherein said message frame further comprises:

an error word having at least one error bit for each of said data words to indicate the occurrence of an anomalous condition during the transmission of said data words.

10. A serial data transmission system comprising:

a transmitter for transmitting serially arranged bits of binary information;

a receiver for receiving said bits;

an information carrying communications link extending between said transmitter and said receiver;

means associated with said transmitter for arranging said binary information transmitted by said transmitter into data cycles each having a plurality of serially arranged data containing message frames;

said message frames further divided into message frames containing data of a first type and at least one message frame containing data of a second type;

means associated with said transmitter for establishing a ratio between data cycles transmitted with and data cycles transmitted without message frames containing data of said second type.

11. The serial data transmission system claimed in claim 10, further comprising:

data cards serially arranged in a first group having data of said first type and in a second group having data of said second type;

means for addressing said data cards in a successive serial manner;

means for counting the number of addressed data cards;

comparing means connected to said counting means to compare said data card count with a predetermined number and terminate the data cycle and initiate another data cycle when the data card count equals said predetermined number;

means connected to said comparing means to cause said comparator to terminate the data cycle and initiate another data cycle after said data cards of said first type have been addressed in accordance with said ratio between data cycles transmitted with and data cycles transmitted without message frames containing data of said second type.

12. The serial data transmission system claimed in claim 11, wherein said terminating means comprises a bi-state device which triggers between a first and a second state for each data cycle.

13. The serial data transmission system claimed in claim 12, wherein said comparator further comprises:

a first set of binarily weighted bit inputs and a second set of binarily weighted bit inputs;

the most significant bit position of said first input set maintained at binary 1 and the remaining bit positions of said first input set connected to said address counting means to input the addressed card count into said comparator; and the most significant bit position of said second input set connected to said output of said bi-state device such that the most significant bit of said second input set is binary one every other data cycle, the remaining bit positions of said second input set connected to a means for establishing said predetermined binary number for input to said comparator;

an output of said comparator connected to said addressing means and said counting means.

14. A serial data transmission system comprising:

a transmitter for transmitting serially arranged bits of binary information;

a receiver for receiving said bits;

an information carrying communications link extending between said transmitter and said receiver;

means associated with said transmitter for forming a message frame having at least two binary data words;

means associated with said transmitter for generating the EXCLUSIVE OR result of the corresponding bits of each data word to thereby form a checkword;

each bit of said checkword corresponding to a different bit in each of said data words and representing the EXCLUSIVE OR result of each corresponding bit in said data words;

said transmitter transmitting said checkword serially with said data words;

means associated with said receiver for generating and storing the EXCLUSIVE OR result of the corresponding bits of each received data word to thereby form a receiver generated checkword;

means associated with said receiver for comparing the corresponding bits of said transmitted and said receiver generated checkwords.

15. The serial data transmission system claimed in claim 14, wherein said checkword generating means comprises:

a shift register having its serial input connected to the output of an EXCLUSIVE OR gate;

a serial output of said shift register connected to an input of said gate;

a data word source connected to another input of said gate;

means for synchronously shifting said data words into said shift register through said gate while shifting the contents of said shift register to said gate;

said gate comparing the output of said shift register and said data words and entering the EXCLUSIVE OR result into said shift register to generate said checkword.

16. The serial data transmission system claimed in claim 14, further comprising:

register means connected to a set of parallel inputs of said shift register and adapted to store a predetermined sync word;

said shift register adapted to parallel load said sync word prior to the generation of said checkword.

17. A serial data transmission system comprising:

a transmitter for transmitting serially arranged bits of binary information;

a receiver for receiving said bits;

an information carrying communications link extending between said transmitter and said receiver;

means associated with said transmitter forming the information transmitted by said transmitter into a message frame having the first two bits thereof selected to provide a predetermined transition between binary 1 and binary 0, and a sync word immediately following said predetermined transition, said sync word having predetermined bit values;

said receiver including control means having a preset state and an enable state being switchable from its preset state to its enable state in response to said predetermined transition between binary 1 and binary 0 in the data received by said receiver;

said receiver including verification means responsive to said control means being in its enable state to compare the word received by said receiver immediately following the switching of said control means to its enable state with said predetermined bit values, said verification means resetting said control means to its preset state if the word received by said receiver immediately following the setting of said control means to its enable state does not have said predetermined binary bit values.

* * * * *

UNITED STATES PATENT AND TRADEMARK OFFICE
CERTIFICATE OF CORRECTION

PATENT NO. : 4,208,650
DATED : June 17, 1980
INVENTOR(S) : Robert Horn

It is certified that error appears in the above-identified patent and that said Letters Patent are hereby corrected as shown below:

Column 27, Claim 1, line 8, after "receiver", insert --responsive--;

Column 27, Claim 1, line 14, after "means", insert --, said receiver being disabled from receiving and responding to the remainder of the bits in each message frame--.

Signed and Sealed this

Fifteenth Day of September 1981

[SEAL]

Attest:

Attesting Officer

GERALD J. MOSSINGHOFF
Commissioner of Patents and Trademarks